(12) United States Patent
Kim et al.

(10) Patent No.: US 11,983,343 B2
(45) Date of Patent: May 14, 2024

(54) DISPLAY DEVICE

(71) Applicant: SAMSUNG DISPLAY CO., LTD., Yongin-si (KR)

(72) Inventors: Hyung Bae Kim, Hwaseong-si (KR); Sang Kook Kim, Cheonan-si (KR); Tae Joon Kim, Seongnam-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/086,010

(22) Filed: Dec. 21, 2022

(65) Prior Publication Data
US 2023/0229248 A1  Jul. 20, 2023

(30) Foreign Application Priority Data

Dec. 24, 2021  (KR) .................. 10-2021-0187736

(51) Int. Cl.
*G06F 3/041* (2006.01)
*G06F 3/044* (2006.01)

(52) U.S. Cl.
CPC .......... *G06F 3/0412* (2013.01); *G06F 3/0446* (2019.05)

(58) Field of Classification Search
CPC .. G06F 2203/04111; G06F 2203/04112; G06F 3/0445; G06F 3/0412; G06F 3/04166; G06F 3/0446
See application file for complete search history.

(56) References Cited

U.S. PATENT DOCUMENTS

| | | | |
|---|---|---|---|
| 2014/0211109 A1* | 7/2014 | Wu | G06F 3/0448 349/12 |
| 2015/0122625 A1* | 5/2015 | Seo | G06F 3/0443 200/5 R |
| 2016/0299611 A1* | 10/2016 | Park | G06F 3/04164 |
| 2018/0143717 A1* | 5/2018 | An | G06F 3/0412 |
| 2020/0301546 A1* | 9/2020 | Ye | G06F 3/0445 |

FOREIGN PATENT DOCUMENTS

| | | |
|---|---|---|
| CN | 109508117 | 3/2019 |
| KR | 10-2012-0133848 | 12/2012 |
| KR | 10-2019-0034386 | 4/2019 |
| KR | 10-2020-0042995 | 4/2020 |

\* cited by examiner

*Primary Examiner* — Robin J Mishler
(74) *Attorney, Agent, or Firm* — F. Chau & Associates, LLC

(57) ABSTRACT

A display device includes a substrate. A plurality of sensing electrodes is on the substrate. A first touch insulating layer is disposed above the plurality of sensing electrodes. A plurality of driving electrodes is disposed on an upper surface of the first touch insulating layer. The plurality of driving electrodes receives a touch driving signal. A touch driving circuit sensing a change amount of mutual capacitance is formed between the plurality of driving electrodes and the plurality of sensing electrodes by the plurality of sensing electrodes. The first touch insulating layer includes an organic material.

17 Claims, 26 Drawing Sheets

(a)

(b)

DISPLAY DEVICE

CROSS-REFERENCE TO RELATED APPLICATION

This application claims priority under 35 U.S.C. § 119 to Korean Patent Application No. 10-2021-0187736, filed on Dec. 24, 2021 in the Korean Intellectual Property Office, the disclosure of which is incorporated by reference in its entirety herein.

1. TECHNICAL FIELD

The present disclosure relates to a display device.

2. DISCUSSION OF RELATED ART

The demand for electronic devices that include a display device for displaying an image has increased with the advancement of the information age. For example, a display device has been applied to various electronic devices such as a smart phone, a digital camera, a notebook computer, a navigator, a smart watch and a smart television.

Recently, flexible display panels capable of being bent, folded and/or rolled have been developed to provide a bendable display device, a foldable display device, a rollable display device, a slidable display device and a stretchable display device. These display devices having a flexible display panel applied thereto may provide increased user convenience and portability. The flexible display panel may include a touch sensor for recognizing a touch input. The touch sensor includes a plurality of touch electrodes driven in a capacitance manner to sense a touch of a user.

In a display device having a flexible display panel applied thereto, a thickness of a passivation layer above the touch sensor may be formed in an ultrathin shape to reduce bending stress of the display device. However, when the thickness of the passivation layer is formed in an ultrathin shape, a retransmission phenomenon may occur in which a portion of the charges that will exit through a body of a user is retransmitted as capacitance of touch electrodes. In this case, there is little or no difference between the capacitance of the touch electrodes in which the touch occurs and capacitance of the touch electrodes before the touch occurs. Therefore, the touch of the user may not be recognized.

SUMMARY

An object of the present disclosure is to provide a display device that may precisely recognize a touch input of a user by preventing retransmission from occurring.

The objects of the present disclosure are not limited to those mentioned above and additional objects of the present disclosure, which are not mentioned herein, will be clearly understood by those skilled in the art from the following description of the present disclosure.

According to an embodiment of the present disclosure, a display device includes a substrate. A plurality of sensing electrodes is on the substrate. A first touch insulating layer is disposed above the plurality of sensing electrodes. A plurality of driving electrodes is disposed on an upper surface of the first touch insulating layer. The plurality of driving electrodes receives a touch driving signal. A touch driving circuit sensing a change amount of mutual capacitance is formed between the plurality of driving electrodes and the plurality of sensing electrodes by the plurality of sensing electrodes. The first touch insulating layer includes an organic material.

According to an embodiment of the present disclosure, a display device includes a substrate. A pixel electrode is on the substrate. A pixel defining layer includes an opening that exposes the pixel electrode. A light emitting layer is disposed in the opening of the pixel defining layer on the pixel electrode. A common electrode is on the light emitting layer. An encapsulation layer is on the common electrode. A plurality of sensing electrodes is on the encapsulation layer. A first touch insulating layer is disposed above the plurality of sensing electrodes. A plurality of driving electrodes is on an upper surface of the first touch insulating layer. The plurality of driving electrodes receive a touch driving signal. A first capacitance formed by the common electrode and any one of the plurality of driving electrodes is less than a second capacitance formed by the common electrode and any one of the plurality of sensing electrodes.

According to an embodiment of the present disclosure, a flexible display device includes a flexible display panel. A roller is disposed at a first end of the display panel. The roller winding and unwinding the flexible display panel. The flexible display panel includes a substrate. A plurality of sensing electrodes is disposed on the substrate. A first touch insulating layer is disposed above the plurality of sensing electrodes. A plurality of driving electrodes is disposed on an upper surface of the first touch insulating layer. A touch driving circuit sensing a change amount of mutual capacitance formed between the plurality of driving electrodes and the plurality of sensing electrodes by the plurality of sensing electrodes.

In a display device according to embodiments of the present disclosure, a driving electrode and a sensing electrode are disposed in different conductive layers, whereby retransmission of charges may be avoided. Therefore, a touch input of a user may be accurately recognized.

The effects according to embodiments of the present disclosure are not limited to those mentioned above and more various effects are included in the following description of the disclosure.

BRIEF DESCRIPTION OF THE DRAWINGS

The above and other aspects and features of the present disclosure will become more apparent by describing in detail embodiments thereof with reference to the attached drawings, in which.

DETAILED DESCRIPTION OF EMBODIMENTS

The invention will now be described more fully hereinafter with reference to the accompanying drawings, in which embodiments of the present disclosure are shown. This invention may, however, be embodied in different forms and should not be construed as limited to the embodiments set forth herein.

It will also be understood that when a layer is referred to as being "on" another layer or substrate, it can be directly on the other layer or substrate, or intervening layers may also be present. When a layer is referred to as being "directly on" another layer or substrate, no intervening layers may be present. The same reference numbers indicate the same components throughout the specification.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the invention. Similarly, the second element could also be termed the first element.

Hereinafter, detailed embodiments of the present disclosure will be described with reference to the accompanying drawings.

Figure 1:
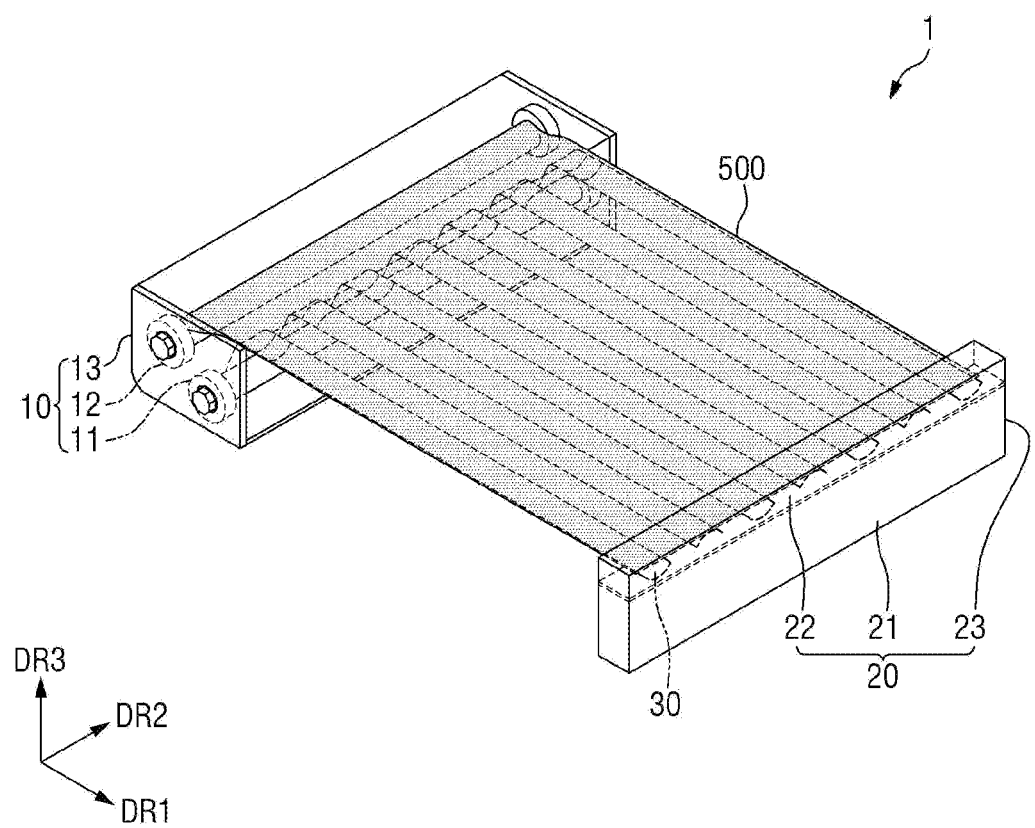
FIG. 1 is a perspective view illustrating a display device according to an embodiment of the present disclosure.
Figure 2:
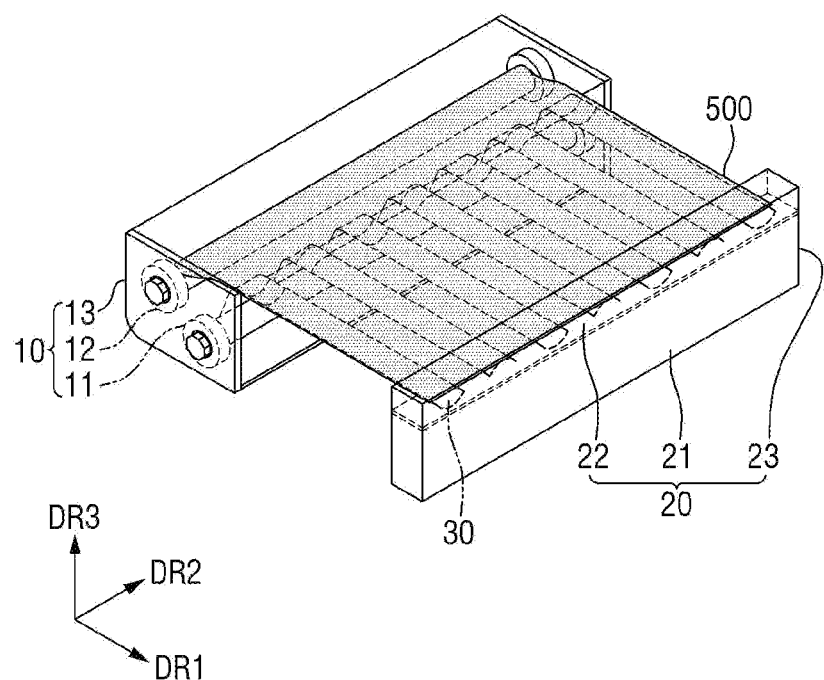
FIG. 2 is a perspective view illustrating an operation of a display device of FIG. 1 according to an embodiment of the present disclosure.

FIG. 1 is a perspective view illustrating a display device according to an embodiment. FIG. 2 is a perspective view illustrating an operation of a display device according to FIG. 1.

Referring to FIGS. 1 and 2, various electronic devices for providing a display screen may be included in a display device 1. Examples of the display device 1 may include, but are not limited to, a mobile phone, a smart phone, a table personal computer (PC), a mobile communication terminal, an electronic diary, an electronic book, a personal digital assistant (PDA), a portable multimedia player (PMP), a navigator, an ultra mobile PC (UMPC), a television, a game device, a wrist watch type electronic device, a head mounted display, a monitor of a personal computer, a notebook computer, a vehicle dashboard, a digital camera, a camcorder, an outdoor signboard, an electronic display board, various medical devices, various test devices, various home appliances including a display region, such as a refrigerator or a washing machine, and a device for Internet of things (IoT). An example of the display device 1, which will be described later, may include, but is not limited to, a smart phone, a tablet PC or a notebook computer.

A first direction DR1, a second direction DR2 and a third direction DR3 are marked in FIGS. 1 and 2. In the embodiments, the first direction DR1 and the second direction DR2 are directions different from each other, and cross each other. The first direction DR1 may be a vertical direction of the display device 1 and the second direction DR2 may be a horizontal direction of the display device 1, but embodiments of the present disclosure are not necessarily limited thereto. In the following embodiments, one side of the first direction DR1 refers to an upper direction on a plan view, the other side of the first direction DR1 refers to a lower direction on the plan view, one side of the second direction DR2 refers to a right direction on the plan view, and the other side of the second direction DR2 refers to a left direction on the plan view. The third direction DR3 may be a thickness direction of the display device 1. However, it is to be understood that the direction mentioned in embodiments refers to a relative direction, and embodiments are not necessarily limited to the direction mentioned herein. For example, while embodiments show the first to third directions DR1 to DR3 as being perpendicular to each other, the first to third directions DR1 to DR3 may cross each other in various different angles in some embodiments.

The display device 1 according to an embodiment may include a first module 10, a second module 20 spaced apart from the first module 10, a support 30 and a display panel 500.

The first module 10 and the second module 20 may be spaced apart from each other along the first direction DR1. Each of the first module 10 and the second module 20 may extend along the second direction DR2.

In an embodiment, the display panel 500 may include a liquid crystal display panel, an organic light emitting diode display panel, an inorganic light emitting diode display panel or a quantum dot display panel. Hereinafter, although the display panel 500 is described as an organic light emitting diode display panel, embodiments of the present disclosure are not necessarily limited thereto.

The display panel 500 may be wound and unwound. For example, a predetermined ductility is given to the display panel 500 so that a rolling or winding operation or an unrolling or unwinding operation may be easily and repeatedly performed.

The first module 10 may include a first housing 13, and first and second rollers 11 and 12 disposed in the first housing 13. The first roller 11 and the second roller 12 may be spaced apart from each other in the first housing 13.

A plurality of supports 30 may be provided. The plurality of supports 30 may be spaced apart along the second direction DR2. The plurality of supports 30 may have first ends fixed to the first roller 11 in the first housing 13, and may be extended along the first direction DR1. A first end of the display panel 500 may be fixed to the second roller 12 that will be described later. Although seven supports 30 are shown, it will be apparent that the supports 30 are not necessarily limited to seven and may include six or less or eight or more.

The display panel 500 may be disposed to overlap the plurality of supports 30. The display panel 500 may include a first surface and a second surface opposite to the first surface. The first surface of the display panel 500 may be a display surface. The plurality of supports 30 may be disposed on the second surface of the display panel 500.

The second module 20 may include a second housing 23 to which the second end of the support 30 is fixed. The second module 20 may further include a frame 22 disposed in the second housing 23, and a battery 21. The second end of the support 30 and the second end of the display panel 500 may be fixed to the frame 22. The battery 21 may be positioned on a lower portion of the frame 22. In an embodiment, the battery 21 is included in the second module 20 and occupies most of a weight of the second module 20.

In an embodiment, the first roller 11 and the second housing 23 for fixing the support 30 may directly fix first and second ends of the support 30 and indirectly fix first and second ends of the support 30 by an additional fastening element.

Referring to FIG. 2, the second module 20 may move to be close to or far away from the first module 10 in the first direction DR1.

When the second module 20 is close to the first module 10, the support 30 is wound around the first roller 11, and as the first module 10 is far away from the first module 10, the support 30 may be unwound from the first roller 11. When the support 30 is wound around the first roller 11, the support 30 may form a concave or convex pattern, but embodiments of the present disclosure are not necessarily limited thereto. When the support 30 is unwound from the first roller 11, the support 30 may be unfolded to be flat.

As the second module 20 is close to first module 10, the display panel 500 may be wound around the second roller 12, and as the first module 10 is far away from the first module 10, the display panel 500 may be unwound from the second roller 12. When the display panel 500 is unwound from the second roller 12, the support 30 is unwound from the first roller 11, and may maintain a concave or convex pattern.

Figure 3:
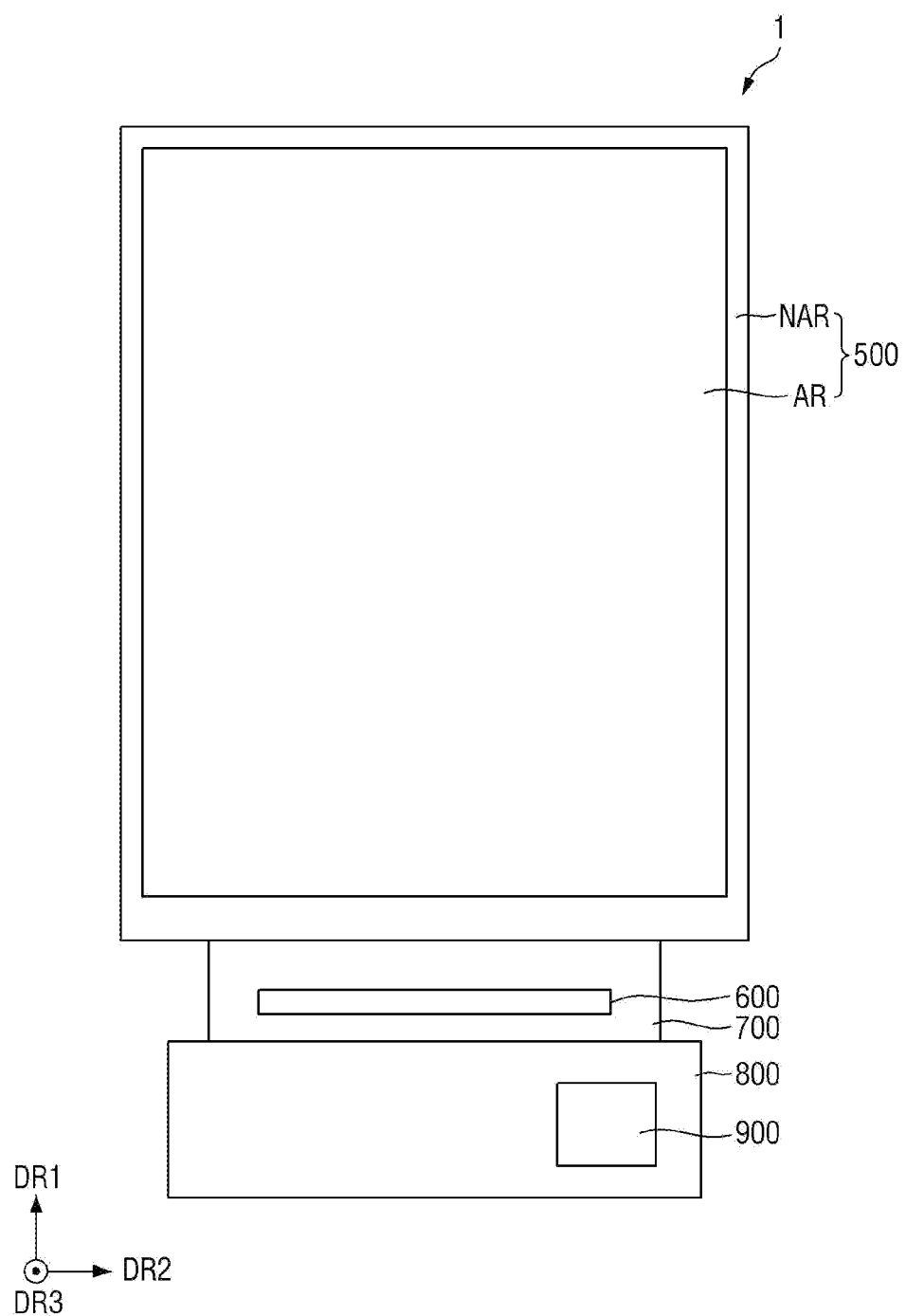
FIG. 3 is a schematic plan view illustrating a display panel according to an embodiment of the present disclosure.
Figure 4:
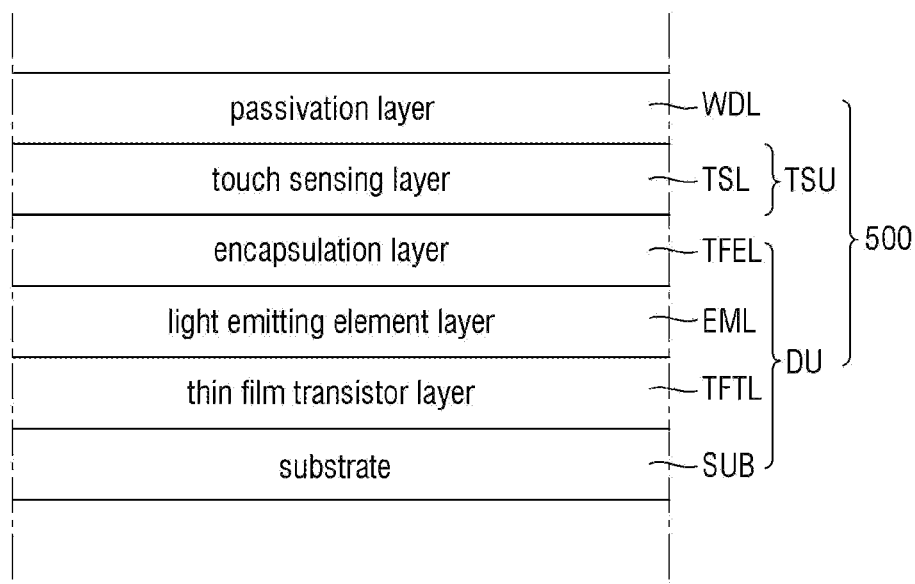
FIG. 4 is a schematic cross-sectional view illustrating a display panel according to an embodiment of the present disclosure.

FIG. 3 is a plan view illustrating a display panel according to an embodiment of the present disclosure. FIG. 4 is a schematic cross-sectional view illustrating a display panel according to an embodiment of the present disclosure.

Referring to FIG. 3, the display device 1 may further include a display driving circuit 600, a connection member 700, a circuit board 800 and a touch driving circuit 900, which are disposed at (e.g., attached to) one end (e.g., a lower end) of the display panel 500 in the first direction DR1. However, embodiments of the present disclosure are not necessarily limited thereto and the connection member 700, the circuit board 800 and the touch driving circuit 900 may be positioned on other portions of the display device 1 in some embodiments.

The display panel 500 may include an active region AR for displaying an image, and a non-active region NAR that is a peripheral region of the active region AR.

The active region AR may include a plurality of pixels for displaying an image, and may overlap a touch sensing region in which a touch input is sensed.

The non-active region NAR may be a bezel region disposed near the active region AR. Signal lines or driving circuits for applying a signal to a display region or a touch sensing region of the active region AR may be disposed in the non-active region NAR, but embodiments of the disclosure are not necessarily limited thereto. For example, the non-active region NAR may not be disposed in at least a portion of the peripheral region of the active region AR.

The display driving circuit 600 may generate signals and voltages for driving the display panel 500. In an embodiment, the display driving circuit 600 may be formed as an integrated circuit IC, and may be attached onto the display panel 500 by a chip on glass (COG) method, a chip on plastic (COP) method or an ultrasonic bonding method, but embodiments of the present disclosure are not necessarily limited thereto. For example, the display driving circuit 600 may be attached onto the circuit board 800 by a chip on film (COF) method. In this embodiment, the connection member 700 may correspond to a chip on film (COF), and may connect the display panel 500 with the circuit board 800.

The circuit board 800 may be attached to one end of the display panel 500 through the connection member 700. Therefore, the circuit board 800 may be electrically connected to the display panel 500 and the display driving circuit 600. The display panel 500 and the display driving circuit 600 may receive digital video data, timing signals and driving voltages through the circuit board 800. In an embodiment, the circuit board 800 may be a flexible film such as a flexible printed circuit board, a printed circuit board or a chip on film.

The touch driving circuit 900 may be packaged on the circuit board 800. The touch driving circuit 900 may be connected to a touch sensor (TSU of FIG. 4) of the display panel 500. The touch driving circuit 900 may supply a touch driving signal to a plurality of touch electrodes of the touch sensor TSU, and may sense a change amount in capacitance between the plurality of touch electrodes. For example, the touch driving signal may be a pulse signal having a predetermined frequency. The touch driving circuit 900 may calculate a touch input and touch coordinates based on the change amount in capacitance between the plurality of touch electrodes. The touch driving circuit 900 may be formed as an integrated circuit (IC).

Referring to FIG. 4, the display device 1 may include a display unit DU, a touch sensor TSU and a passivation layer WDL. The display unit DU may include a substrate SUB, a thin film transistor layer TFTL, a light emitting element layer EML and an encapsulation layer TFEL.

In an embodiment, the substrate SUB may be made of an insulating material such as glass or a polymer resin. For example, the substrate SUB may include polyimide. The substrate SUB may be a flexible substrate capable of being subjected to bending, folding, rolling or the like.

The thin film transistor layer TFTL may include a plurality of thin film transistors for driving pixels, and a plurality of display signal lines. The plurality of display signal lines may include a scan line for transferring a scan signal to each pixel and a data line for transferring a data signal.

The light emitting element layer EML disposed on one surface of the thin film transistor layer TFTL may include light emitting elements (170 of FIG. 7) that emit light. In an embodiment, each of the light emitting elements 170 may be an organic light emitting diode that includes an anode electrode, a cathode electrode and an organic light emitting layer disposed between the anode electrode and the cathode electrode. The anode electrode may be supplied with a first power voltage of a high potential through the thin film transistor, and the cathode electrode may be supplied with a second power voltage having a low potential.

The encapsulation layer TFEL may be disposed on the light emitting element layer EML. The encapsulation layer TFEL may include a stacked layer of inorganic layers or organic layers to prevent moisture or oxygen from being permeated into the light emitting elements of the light emitting element layer EML.

The touch sensor TSU may be disposed on the encapsulation layer TFEL. The touch sensor TSU may be a touch member that includes a touch sensing layer TSL. The touch sensor TSU may include a plurality of touch electrodes ('SE' of FIG. 5) for sensing a touch of a user, and a plurality of signal lines ('TL' and 'RL' of FIG. 5). The touch sensor TSU may sense a touch of a user in a self-capacitance manner or a mutual capacitance manner.

The passivation layer WDL may be disposed on the touch sensor TSU. In an embodiment, the passivation layer WDL may include a window member that includes a rigid material such as glass or quartz. The passivation layer WDL may include an optical transparent adhesive for attaching the window member and the touch sensor TSU to each other, and may include a polarizing film for reducing external light reflection.

In an embodiment, the display device 1 may include a very thin window member to enable bending, folding, rolling or the like, or the window member may be omitted. In an embodiment in which the window member is omitted, the passivation layer WDL may be substantially the same as a second touch insulating layer 230 (230 of FIG. 7) of the touch sensor TSU.

Figure 5:
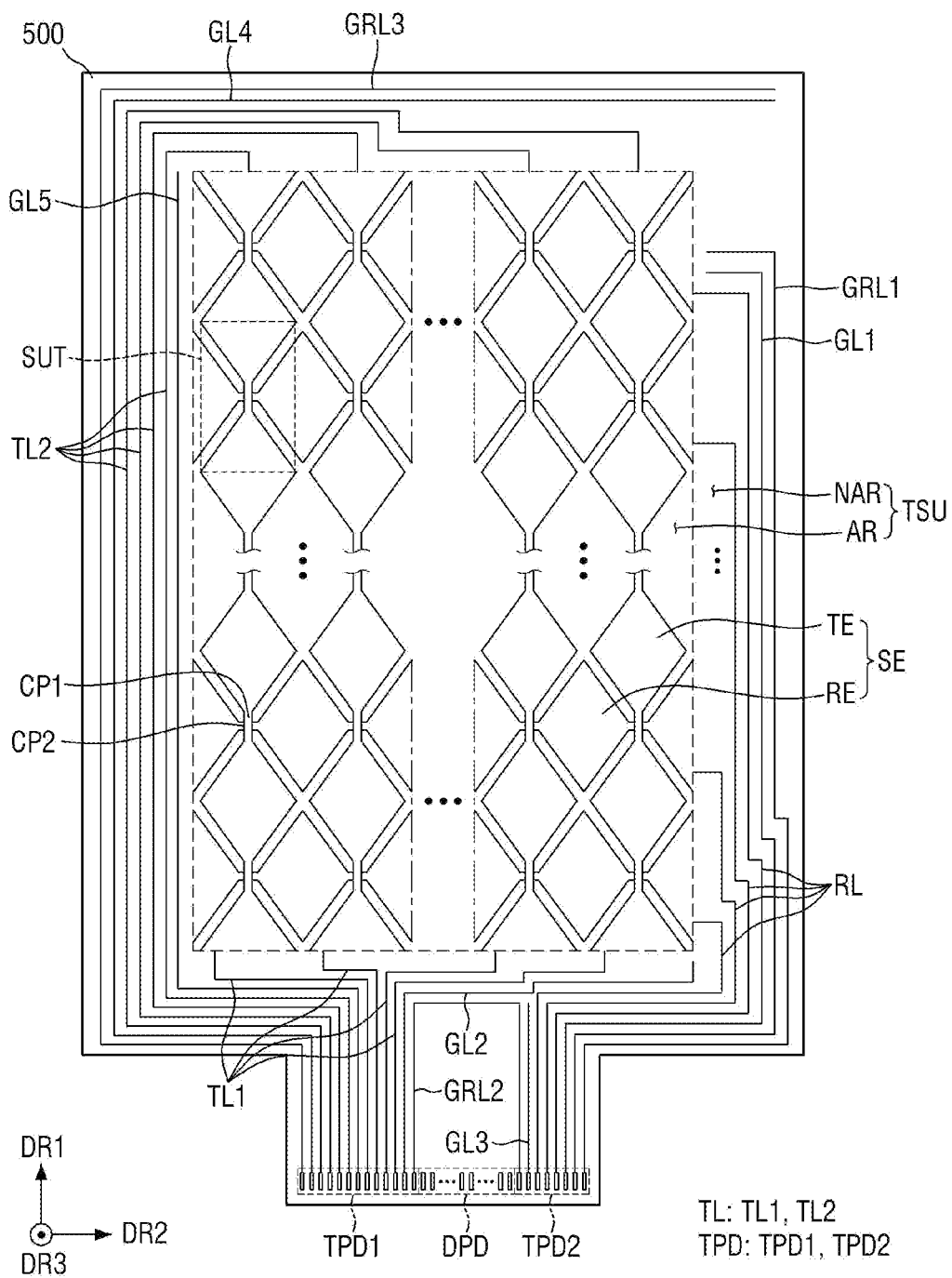
FIG. 5 is a schematic plan layout view illustrating a touch sensor according to an embodiment of the present disclosure.

FIG. 5 is a schematic plan layout view illustrating a touch sensor according to one embodiment.

Referring to FIG. 5, the touch sensor TSU includes a touch sensing region for sensing a touch of a user and a touch peripheral region disposed near the touch sensing region. The touch sensing region corresponds to the above-described active region AR, and the touch peripheral region may correspond to the above-described non-active region NAR.

The active region AR may include a plurality of touch electrodes SE. In an embodiment, the plurality of touch electrodes SE may include two types of electrodes, for example, driving electrodes TE and sensing electrodes RE to apply a touch driving signal to the driving electrodes TE and sense a charge change amount of a mutual capacitance of a unit sensing region SUT through the sensing electrodes RE. Alternatively, in an embodiment the plurality of touch electrodes SE may recognize a touch in a self-capacitance manner including one type of electrode. Although the present disclosure is described based on a touch sensor TSU of a mutual capacitance manner, embodiments of the present disclosure are not necessarily limited thereto.

In an embodiment, the touch sensor TSU may include a plurality of driving electrodes TE, a plurality of sensing electrodes REs, a plurality of driving lines TL, a plurality of sensing lines RL, and a plurality of touch pads TPD.

The plurality of driving electrodes TE may be electrically connected to each other in the first direction DR1, and may be spaced apart from each other in the second direction DR2. The driving electrodes TE adjacent to each other in the first direction DR1 may be connected to each other through a first connection portion CP1.

The plurality of sensing electrodes RE may be electrically connected to each other in the second direction DR2 and may be spaced apart from each other in the first direction DR1. The sensing electrodes RE adjacent to each other in the second direction DR2 may be connected to each other through the second connection portion CP2.

In the touch sensor TSU according to an embodiment, since the plurality of driving electrodes TE and the first connection portion CP1 and the plurality of sensing electrodes RE and the second connection portion CP2 are disposed in different touch conductive layers, they may be electrically insulated from one another in their intersection regions.

The plurality of signal lines may be disposed in the non-active region NAR. In an embodiment, the plurality of signal lines may include a plurality of driving lines TL respectively connected to the plurality of driving electrodes TE, and a plurality of sensing lines RL respectively connected to the plurality of sensing electrodes RE.

In an embodiment, the plurality of driving lines TL may include a first driving line TL1 connected to a driving electrode TE disposed at one end (e.g., a lower end) of the driving electrodes TE electrically connected in the first direction DR1 and a second driving line TL2 connected to a driving electrode TE disposed at the other end thereof (e.g., an upper end). For example, the first driving line TL1 may be connected to the driving electrode TE at a lower side of the active region AR, and the second driving line TL2 may be connected to the driving electrode TE at an upper side of the active region AR. In this embodiment, the second driving line TL2 may be connected to the driving electrode TE at the upper side of the active region AR via a right or left edge of the active region AR. The first driving line TL1 and the second driving line TL2 may be connected to a first touch pad TPD1. Therefore, the touch driving circuit 900 may be electrically connected to the driving electrodes TE.

The plurality of sensing lines RL may be connected to a sensing electrode RE disposed at one end of the sensing electrodes RE electrically connected in the second direction DR2. For example, in an embodiment shown in FIG. 5, the plurality of sensing lines RL are connected to a sensing electrode RE at a right end (e.g., in the second direction DR2) of the sensing electrodes RE. The sensing lines RL may be connected to a second touch pad TPD2. Therefore, the touch driving circuit 900 may be electrically connected to the sensing electrodes RE.

In an embodiment in which the touch electrodes TE and RE are driven in a mutual capacitance manner, driving signals are supplied to the driving electrodes TE through the first driving line TL1 and the second driving line TL2 to charge mutual capacitance formed in the intersection regions between the sensing electrodes RE and the driving electrodes TE. Then, a change value of the amount of charges of the sensing electrodes RE is measured through the sensing line RL, and a touch input is determined depending on the change value of the amount of charges of the sensing electrodes RE.

In an embodiment, the plurality of touch pads TPD may be electrically connected to the circuit board 800 and the touch driving circuit 900 by using a low resistance high reliability material such as an anisotropic conductive film or SAP. The plurality of touch pads TPD may include a first touch pad TPD1 connected to the plurality of driving lines TL one-to-one and a second touch pad TPD2 connected to the plurality of sensing lines RL one-to-one.

The touch sensor TSU may further include first to fifth guard lines GL1 to GL5 disposed in the non-active region NAR, and first to third ground lines GRL1 to GRL3.

The first guard line GL1 may be disposed outside the outermost sensing line RL. Also, the first ground line GRL1 may be disposed outside the first guard line GL1. For example, the first guard line GL1 may be disposed on a right side (e.g., in the second direction DR2) of the outermost sensing line RL, and the first ground line GRL1 may be disposed on a right side (e.g., in the second direction DR2) of the first guard line GL1.

The second guard line GL2 may be disposed between the innermost sensing line RL and the first driving line TL1 disposed on a right end. Also, the second guard line GL2 may be disposed between the first driving line TL1 disposed on the right end and the second ground line GRL2.

The third guard line GL3 may be disposed between the innermost sensing line RL disposed and the second ground line GRL2. The second ground line GRL2 may be connected to the first touch pad TPD1 and the second touch pad TPD2.

The fourth guard line GL4 may be disposed outside the outermost second driving line TL2. For example, the fourth guard line GL4 may be disposed on a left side (e.g., in the second direction DR2) of the second driving line TL2. Also, the third ground line GRL3 may be disposed outside the fourth guard line GL4.

The fifth guard line GL5 may be disposed inside the innermost second driving line TL2. For example, the fifth guard line GL5 may be disposed between the second driving line TL2 disposed on a right end and the sensing electrodes RE.

In an embodiment, a ground voltage or a predetermined direct current voltage may be applied to the first ground line GRL1, the second ground line GRL2 and the third ground line GRL3. Also, a ground voltage or a predetermined direct current voltage may be applied to the first guard line GL1, the second guard line GL2, the third guard line GL3, the fourth guard line GL4 and the fifth guard line GL5.

Hereinafter, an exemplary plane arrangement and cross-sectional structure of the pixel PX and the touch sensor TSU will be described.

Figure 6:
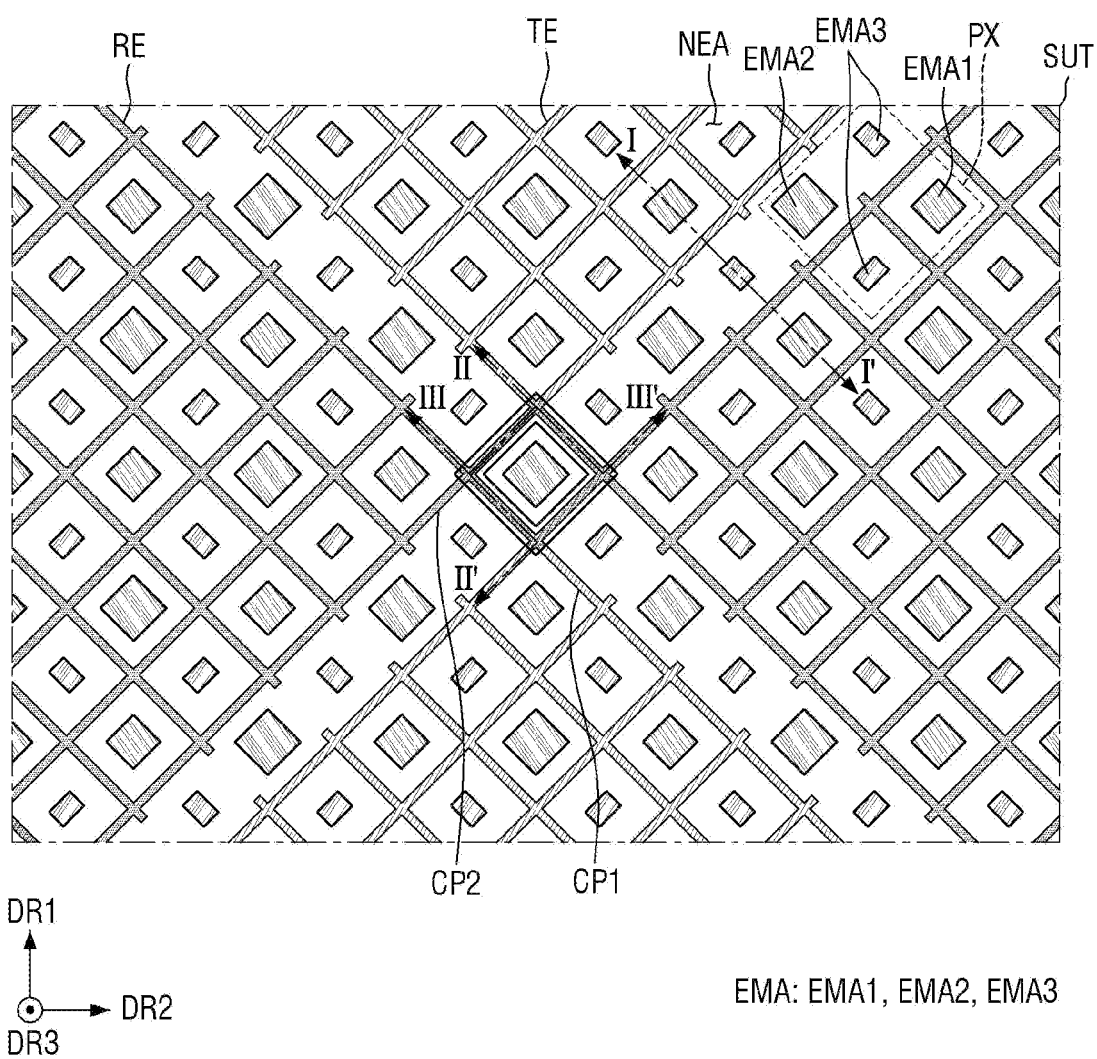
FIG. 6 is a partial enlarged plan view illustrating a pixel of a display unit and touch electrodes of a touch sensor according to an embodiment of the present disclosure.
Figure 7:
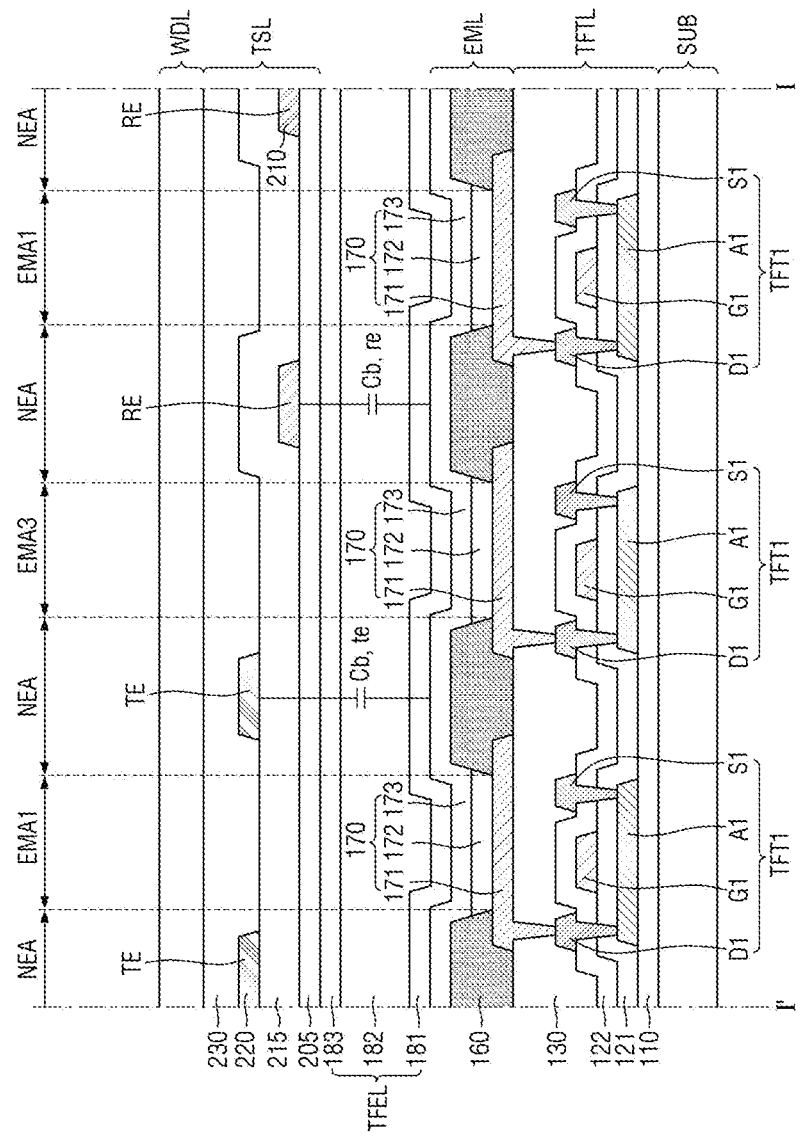
FIG. 7 is a cross-sectional view of a display unit taken along line I-I' of FIG. 6 according to an embodiment of the present disclosure.
Figure 8:
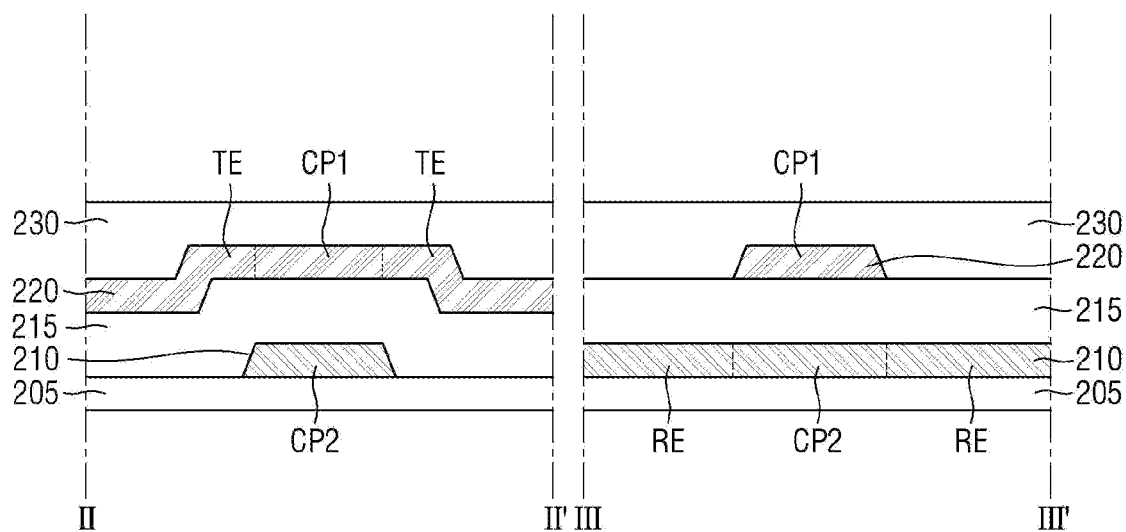
FIG. 8 is a cross-sectional view of a display unit taken along lines II-II' and III-III' of FIG. 6 according to an embodiment of the present disclosure.

FIG. 6 is a partial enlarged view illustrating a pixel of a display unit and touch electrodes of a touch sensor according to an embodiment. FIG. 7 is a cross-sectional view taken along line I-I' of FIG. 6. FIG. 8 is a cross-sectional view taken along lines II-II' and III-III' of FIG. 6.

Referring to FIG. 6, the display unit DU includes a plurality of pixels PX. Each pixel PX includes light emission areas EMA: EMA1, EMA2 and EMA3. While an embodiment shown in FIG. 6 includes three light emission areas EMA, embodiments of the present disclosure are not necessarily limited thereto and the number of light emission areas may vary. Each pixel PX may include a first color pixel, a second color pixel and a third color pixel. The light emission areas EMA of each color pixel may be arranged in various ways. In an embodiment, the first light emission area EMA1 of the first color pixel and the second light emission area EMA2 of the second color pixel may be alternately arranged while forming a first row along the second direction DR2, and the third light emission area EMA3 of the third color pixel may be arranged in a second row, which is adjacent to the first row, along the second direction DR2. The pixels PX belonging to the second row may be alternately arranged in the second direction DR2 with respect to the pixels PX belonging to the first row. The arrangement of the first row and the second row may be repeated along the second direction DR2.

Sizes of the light emission areas EMA in the respective color pixels may be different from each other and shapes thereof may each have a rhombic planar shape or a rectangular planar shape, but are not necessarily limited thereto.

Each of the drive electrodes TE, the sensing electrodes RE and the first and second connection portions CP1 and CP2 may have a mesh shaped pattern. Therefore, the driving electrodes TE, the sensing electrodes RE and the first and second connection portions CP1 and CP2 may not overlap the light emission area EMA of each pixel PX.

Referring to FIGS. 7 and 8, a buffer layer 110 is disposed on the substrate SUB. In an embodiment, the buffer layer 110 may include silicon nitride, silicon oxide or silicon oxynitride.

A plurality of first thin film transistors TFT1 may be disposed on the buffer layer 110.

The plurality of first thin film transistors TFT1 may include a semiconductor layer A1, a gate insulating layer 121 disposed on a portion of the semiconductor layer A1, a gate electrode G1 on the gate insulating layer 121, an interlayer insulating layer 122 covering the semiconductor layer A1 and the gate electrode G1, and source and drain electrodes S1 and D1 on the interlayer insulating layer 122.

The semiconductor layer A1 may form a channel of the first thin film transistor TFT1. In an embodiment, the semiconductor layer A1 may include polycrystalline silicon. However, embodiments of the present disclosure are not necessarily limited thereto. For example, in an embodiment, the semiconductor layer A1 may include a single crystal silicon, a low temperature polycrystalline silicon, an amorphous silicon, or an oxide semiconductor. The oxide semiconductor may include, for example, a two-component compound (ABx), a three-component compound (ABxCy), or a four-component compound (ABxCyDz), which contains indium, zinc, gallium, tin, titanium, aluminum, hafnium (Hf), zirconium (Zr), magnesium (Mg), etc. The semiconductor layer A1 may include a channel region and source and drain regions doped with impurities.

The gate insulating layer 121 is disposed on the semiconductor layer A1. The gate insulating layer 121 electrically insulates the gate electrode G1 from the semiconductor layer A1. In an embodiment, the gate insulating layer 121 may be made of an insulating material, for example, silicon oxide (SiOx), silicon nitride (SiNx), or metal oxide.

The gate electrode G1 of the first thin film transistor TFT1 is disposed on the gate insulating layer 121. The gate electrode G1 may be formed on an upper portion of the channel region of the semiconductor layer A1, that is, a position overlapped with the channel region on the gate insulating layer 121 (e.g., in the third direction DR3).

The interlayer insulating layer 122 may be disposed on the gate electrode G1. In an embodiment, the interlayer insulating layer 122 may include an inorganic insulating material such as silicon oxide (SiOx), silicon nitride (SiNx), silicon oxynitride, hafnium oxide and aluminum oxide. In an embodiment, the interlayer insulating layer 122 may include a plurality of insulating layers, and may further include a conductive layer, which forms a capacitor second electrode, between the insulating layers.

The source electrode S1 and the drain electrode D1 are disposed on the interlayer insulating layer 122. The source electrode S1 of the thin film transistor TFT1 may be electrically connected to the drain region of the semiconductor layer A1 through a contact hole that passes through the interlayer insulating layer 122 and the gate insulating layer 121. In an embodiment, the source electrode S1 and the drain electrode D1 may include one or more metals selected from aluminum (Al), molybdenum (Mo), platinum (Pt), palladium (Pd), silver (Ag), magnesium (Mg), gold (Au), nickel (Ni), neodymium (Nd), iridium (Ir), chromium (Cr), calcium (Ca), titanium (Ti), tantalum (Ta), tungsten (W) and copper (Cu).

A planarization layer 130 may be disposed on the interlayer insulating layer 122 to cover the source electrode S1 and the drain electrode D1. In an embodiment, the planarization layer 130 may be formed of an organic insulating material or the like. The planarization layer 130 may have a flat surface, and may include a contact hole that exposes one of the source electrode S1 and the drain electrode D1.

The light emitting element layer EML may be disposed on the planarization layer 130. The light emitting element layer EML may include a pixel defining layer 160 and a light emitting element 170. The light emitting element 170 may include a pixel electrode 171, a light emitting layer 172 and a common electrode 173.

The pixel electrode 171 of the light emitting element 170 may be disposed on the planarization layer 130. The pixel electrode 171 may be provided for each pixel PX. The pixel electrode 171 may be connected to the source electrode S1 or the drain electrode D1 of the first thin film transistor TFT1 through a contact hole that passes through the planarization layer 130.

In an embodiment, the pixel electrode 171 of the light emitting element 170 may have, but is not necessarily limited to, a single layered structure of molybdenum (Mo), titanium (Ti), copper (Cu), or aluminum (Al), or a stacked layer structure, for example, a multi-layered structure of ITO/Mg, ITO/MgF, ITO/Ag, ITO/Ag/ITO, etc. containing indium-tin-oxide (ITO), indium-zinc-oxide (IZO), zinc oxide (ZnO), indium oxide (In$_2$O$_3$), silver (Ag), magnesium (Mg), aluminum (Al), platinum (Pt), lead (Pb), gold (Au) and nickel (Ni).

The pixel defining layer 160 may be disposed on the pixel electrode 171. The pixel defining layer 160 may be formed in regions overlapped with the pixel electrode 171 to form an opening that exposes the pixel electrode 171. The regions where the exposed pixel electrode 171 and the light emitting layer 172 overlap each other may be defined as the first to third light emission areas EMA1, EMA2 and EMA3 in accordance with the first to third color pixels included in each pixel PX.

In an embodiment, the pixel defining layer 160 may include an organic insulating material such as polyacrylates resin, epoxy resin, phenolic resin, polyamides resin, polyimides rein, unsaturated polyesters resin, poly phenylenethers resin, polyphenylenesulfides resin or benzocyclobutene (BCB). However, embodiments of the present disclosure are not necessarily limited thereto. For example, in an embodiment the pixel defining layer 160 may include an inorganic material such as silicon nitride.

The light emitting layer 172 may be disposed on the pixel electrode 171 of the light emitting element 170 exposed by the opening of the pixel defining layer 160. The light emitting layer 172 may include a polymer material or a low molecular material, and may emit red, green or blue light for each color pixel included in each pixel PX. The light emitted from the light emitting layer 172 may form an image for displaying to the user.

The common electrode 173 may be disposed on the light emitting layer 172 and the pixel defining layer 160. In an embodiment, the common electrode 173 may be disposed over the plurality of pixels PX in the form of covering the light emitting layer 172 and the pixel defining layer 160. In an embodiment, the common electrode 173 may include a conductive material having a low work function, for example, Li, Ca, LiF/Ca, LiF/Al, Al, Mg, Ag, Pt, Ni, Au Nd, Ir, Cr, BaF, Ba or their compound or mixture (e.g., mixture of Ag and Mg). Alternatively, the common electrode 173 may include a transparent metal oxide, for example, indium-tin-oxide (ITO), indium-zinc-oxide (IZO), zinc oxide (ZnO), etc.

The encapsulation layer TFEL may be disposed on the light emitting element layer EML. The encapsulation layer TFEL may include at least one inorganic layer to prevent oxygen or moisture from being permeated into the light emitting layer 172. For example, in an embodiment as shown in FIG. 7 the encapsulation layer TFEL may include a first inorganic encapsulation layer 181, an organic encapsulation layer 182, and a second inorganic encapsulation layer 183.

A base layer 205, a first touch conductive layer 210, a first touch insulating layer 215, a second touch conductive layer 220 and a second touch insulating layer 230 of the touch sensing layer TSL may be sequentially disposed on the encapsulation layer TFEL.

For example, the first touch conductive layer 210 is disposed on the base layer 205 (e.g., disposed on an upper surface of the base layer 205). The first touch conductive layer 210 is covered by the first touch insulating layer 215. For example, the first touch insulating layer 215 is disposed on an upper surface and lateral side surfaces of the first touch conductive layer 210. The first touch insulating layer 215 insulates the first touch conductive layer 210 from the second touch conductive layer 220. The second touch conductive layer 220 is disposed on the first touch insulating layer 215. For example, the second touch conductive layer 220 is disposed on an upper surface of the first touch insulating layer 215. The second touch insulating layer 230 may cover and protect the second touch conductive layer 220.

In an embodiment, the base layer 205 may include an inorganic insulating material. In some embodiments, the base layer 205 may be replaced with the second inorganic encapsulation layer 183 that constitutes the thin film encapsulation layer TFEL described below. In this embodiment, the first touch conductive layer 210 may be directly disposed on the second inorganic encapsulation layer 183.

Since the first touch conductive layer 210 and the second touch conductive layer 220 are disposed to overlap the pixel defining layer 160 and have a mesh shaped pattern that does not overlap the light emission area EMA, the first touch conductive layer 210 and the second touch conductive layer 220 do not interfere with light emission and are not visible to a user.

In an embodiment, the first touch conductive layer 210 disposed below the first touch insulating layer 215 includes a second connection portion CP2 and a sensing electrode RE, and the second touch conductive layer 210 disposed on the first touch insulating layer 215 (e.g., disposed above the first touch insulating layer 215) may include a first connection portion CP1 and a driving electrode TE. Since the driving electrode TE and the sensing electrode RE are included in their respective conductive layers different from each other, the driving electrode TE and the sensing electrode RE may be insulated from each other in their intersection region. The driving electrode TE and the sensing electrode RE do not overlap each other, and the first and second connection portions CP1 and CP2 may overlap each other in a thickness direction of the substrate SUB in their intersecting region.

In an embodiment in which the driving electrode TE and the sensing electrode RE are formed in a mesh shaped pattern, the first touch conductive layer 210 and the second touch conductive layer 220 may be made of a low resistance material such as aluminum.

A parasitic capacitance Cb may be formed between the common electrode 173 and the first and second touch conductive layers 210 and 220. For example, the parasitic capacitance Cb may be formed by the common electrode 173 and the first touch conductive layer 210 or the common electrode 173 and the second touch conductive layer 220. An insulating material, such as the encapsulation layer TFEL, the base layer 205 and the first touch insulating layer 215, interposed between the electrodes may serve as a dielectric layer of a parasitic capacitor.

In an embodiment, the first touch insulating layer 215 may include an organic insulating material such as polyacrylates resin, epoxy resin, phenolic resin, polyamides resin, polyimides rein, unsaturated polyesters resin, poly phenylenethers resin, polyphenylenesulfides resin or benzocyclobutene (BCB). The second touch insulating layer 230 may also include an organic insulating material in the same manner as the first touch insulating layer 215.

In an embodiment in which the first touch insulating layer 215 includes an organic insulating material, a modulus of elasticity may be lower than that of the inorganic insulating material. For example, in a comparative embodiment in which an inorganic insulating material having a high modulus of elasticity is used in a first touch insulating layer 215, a crack or gap may occur in the display panel due to stress caused by bending or folding of the display panel. On the other hand, since an organic insulating material having a low modulus of elasticity is strong to stress caused by bending or folding of the display panel 500, bending stress recognized by the touch sensor TSU may be reduced about 20 times as compared with the inorganic insulating material. When bending stress is reduced, since a crack or gap may be prevented from occurring in the display panel 500, the display device 1 may have increased durability.

In addition, as thicknesses of the encapsulation layer TFEL, the second touch insulating layer 230 and the passivation layer WDL are reduced, bending stress caused by bending or folding of the display panel 500 may be reduced.

In an embodiment in which the thicknesses of the second touch insulating layer 230 and the passivation layer WDL are formed in an ultrathin shape or the passivation layer WDL is omitted, a portion of the amount of charges that will exit through a body of a user is retransmitted to the sensing electrode RE, and the amount of this retransmission is increased. This reduces the change amount of the capacitance of the touch electrodes SE in which the touch is generated, whereby the touch sensor TSU may not recognize the touch of the user.

The display device 1 according to an embodiment increases the amount of charges that exit through the body of the user and reduces the amount of charges that are retransmitted to the sensing electrode RE, whereby the driving electrode TE and the sensing electrode RE may be disposed in different layers with the first touch insulating layer 215 interposed therebetween to increase touch sensitivity of the touch sensor TSU. For example, the sensing electrode RE may be disposed below the first touch insulating layer 215, and the driving electrode TE may be disposed on the first touch insulating layer 215.

In an embodiment in which the first touch insulating layer 215 includes an organic insulating material having a coating property higher than that of an inorganic insulating material, the first touch insulating layer 215 including an organic insulating material may be thicker than the first touch insulating layer 215 including an inorganic insulating material. For example, the thickness of the first touch insulating layer 215 may be increased up to about 9 times as compared with an embodiment in which the first touch insulating layer 215 includes an inorganic insulating material. When the first touch insulating layer 215 becomes thick, environments of the first touch conductive layer 210 and the second touch conductive layer 220 disposed with the first touch insulating layer 215 interposed therebetween may be different from each other. For example, a first parasitic capacitance Cb,te formed by the first touch conductive layer 210 and the common electrode 173 may be less than a second parasitic capacitance Cb,re formed by the second touch conductive layer 220 and the common electrode 173.

The display device 1 according to an embodiment may increase the second parasitic capacitance Cb,re by disposing the sensing electrode RE below the first touch insulating layer 215, and may reduce the first parasitic capacitance Cb,te by disposing the driving electrode TE on the first touch insulating layer 215. In addition, the display device 1 may increase the first touch capacitance ('Cf,te' of FIG. 16), and may reduce the second touch capacitance ('Cf,re' of FIG. 16). Therefore, bending stress of the touch sensor TSU and the display panel 500 may be reduced, and touch sensitivity of the user may be increased. This will be described in detail with reference to FIGS. 11 to 18.

In an embodiment, the plurality of signal lines TL and RL may be formed in a double line structure that the signal lines overlaps each other in different conductive layers. In this embodiment, resistance of the signal lines may be reduced. For example, the driving lines TL may include a first sub-driving line and a second sub-driving line, which overlap each other (e.g., in the third direction DR3). The first sub-driving line may be disposed on the same layer as the first touch conductive layer 210 and may include the same material as that of the first touch conductive layer 210, and the second sub-driving line may be disposed on the same layer as the second touch conductive layer 220 and may include the same material as that of the second touch conductive layer 220. In addition, the sensing lines RL may include a first sub-sensing line and a second sub-sensing line, which overlap each other (e.g., in the third direction DR3). The first sub-sensing line may be disposed on the same layer as the first touch conductive layer 210 and may include the same material as that of the first touch conductive layer 210, and the second sub-sensing line may be disposed on the same layer as the second touch conductive layer 220 and may include the same material as that of the second touch conductive layer 220.

Figure 9:
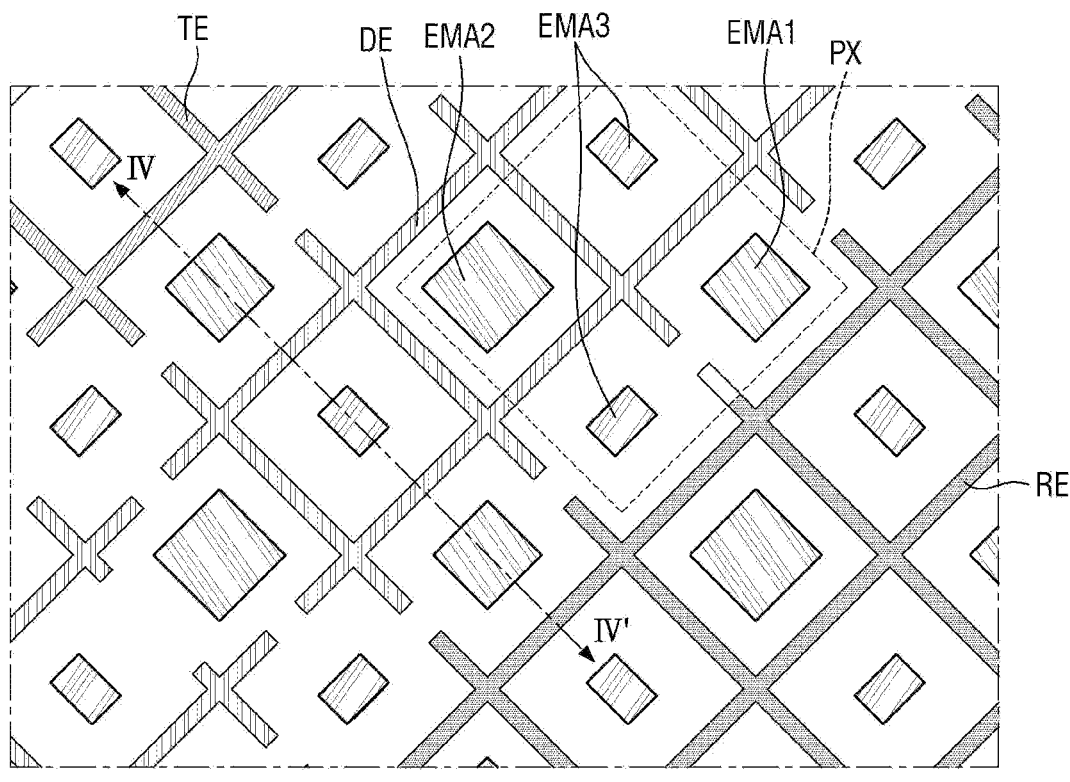
FIG. 9 is a partial enlarged plan view illustrating a pixel of a display unit and touch electrodes of a touch sensor according to an embodiment of the present disclosure.
Figure 9:
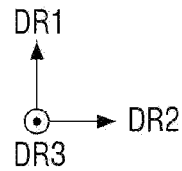
Figure 10:
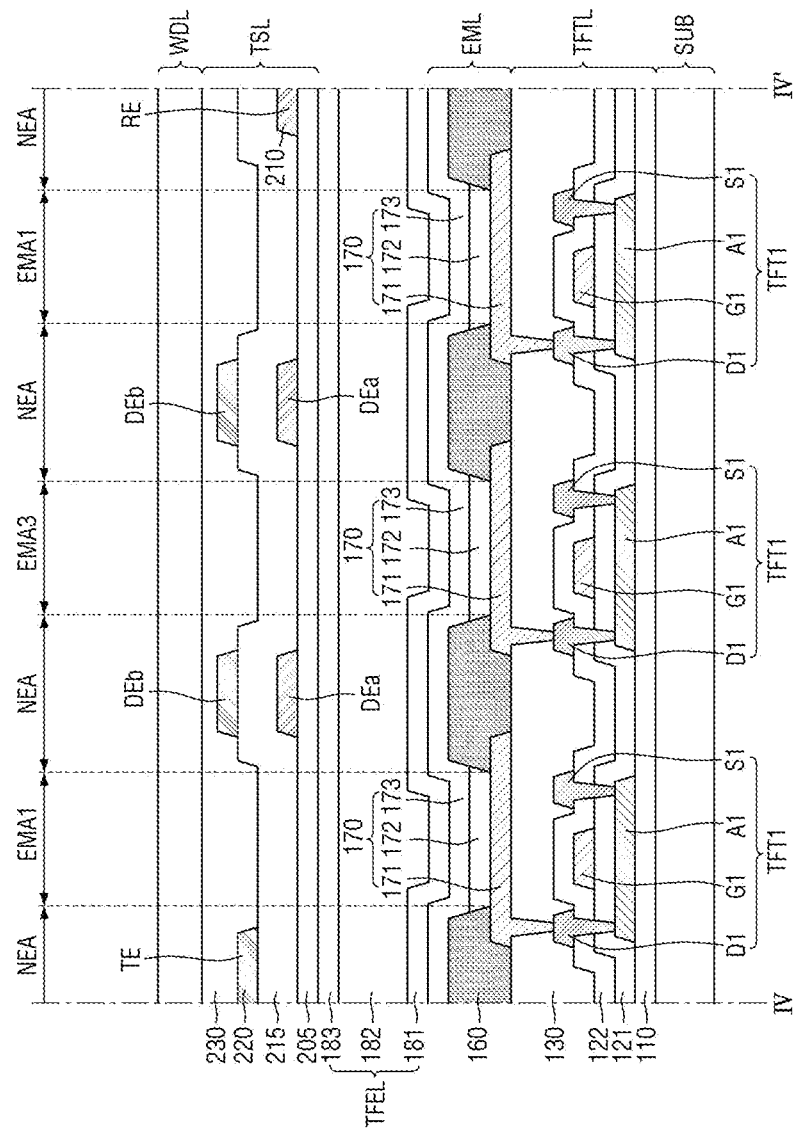
FIG. 10 is a cross-sectional view of a display unit taken along line IV-IV' of FIG. 9 according to an embodiment of the present disclosure.

FIG. 9 is a partial enlarged view illustrating a pixel of a display unit and touch electrodes of a touch sensor according to an embodiment. FIG. 10 is a cross-sectional view taken along line IV-IV' of FIG. 9.

The touch sensor TSU of FIGS. 9 and 10 is different from that of the embodiment shown in FIG. 6 in that the touch sensor TSU of FIGS. 9 and 10 further includes dummy electrodes DE, such as a first sub-dummy electrode DEa and a second sub-dummy electrode DEb spaced apart from the driving electrodes TE and the sensing electrodes RE.

The dummy electrodes DE may be disposed between the driving electrode TE and the sensing electrode RE, or may be surrounded by the driving electrode TE or the sensing electrode RE. Referring to FIGS. 9 and 10, the dummy electrode DE is shown as being disposed between the driving electrode TE and the sensing electrode RE. The dummy electrodes DE may include the first sub-dummy electrode DEa and the second sub-dummy electrode Deb, which are disposed on the same layer as the first touch conductive layer 210 and the second touch conductive layer 220 to overlap them on a plane. In an embodiment, the first sub-dummy electrode DEa may be made of the same material as that of the first touch conductive layer 210, and the second sub-dummy electrode DEb may be made of the same material as that of the second touch conductive layer 220.

The first and second sub-dummy electrodes DEa and DEb may be formed of mesh shaped electrodes. No voltage is applied to the first and second sub-dummy electrodes DEa and DEb. For example, the first and second sub-dummy electrodes DEa and Deb may be electrically floated. As a planar area of the dummy electrode DE becomes wider, the parasitic capacitance Cb may be reduced between the common electrode 173 of the light emitting element layer EML and the touch electrodes SE of the touch sensor TSU. When the parasitic capacitance Cb is reduced, a charging speed in which the mutual capacitance is charged may be increased. However, as the area of the dummy electrode DE becomes wider, the mutual capacitance between the driving electrodes TE and the sensing electrodes RE may also be reduced, and thus touch sensitivity may be reduced. Therefore, it is preferable that the area of the dummy electrode DE is properly set in consideration of the parasitic capacitance and the mutual capacitance.

The principle that a body touch input of the touch sensor TSU is recognized by the mutual capacitance method in accordance with an embodiment and the principle that touch sensitivity is increased will be described.

Figure 11:
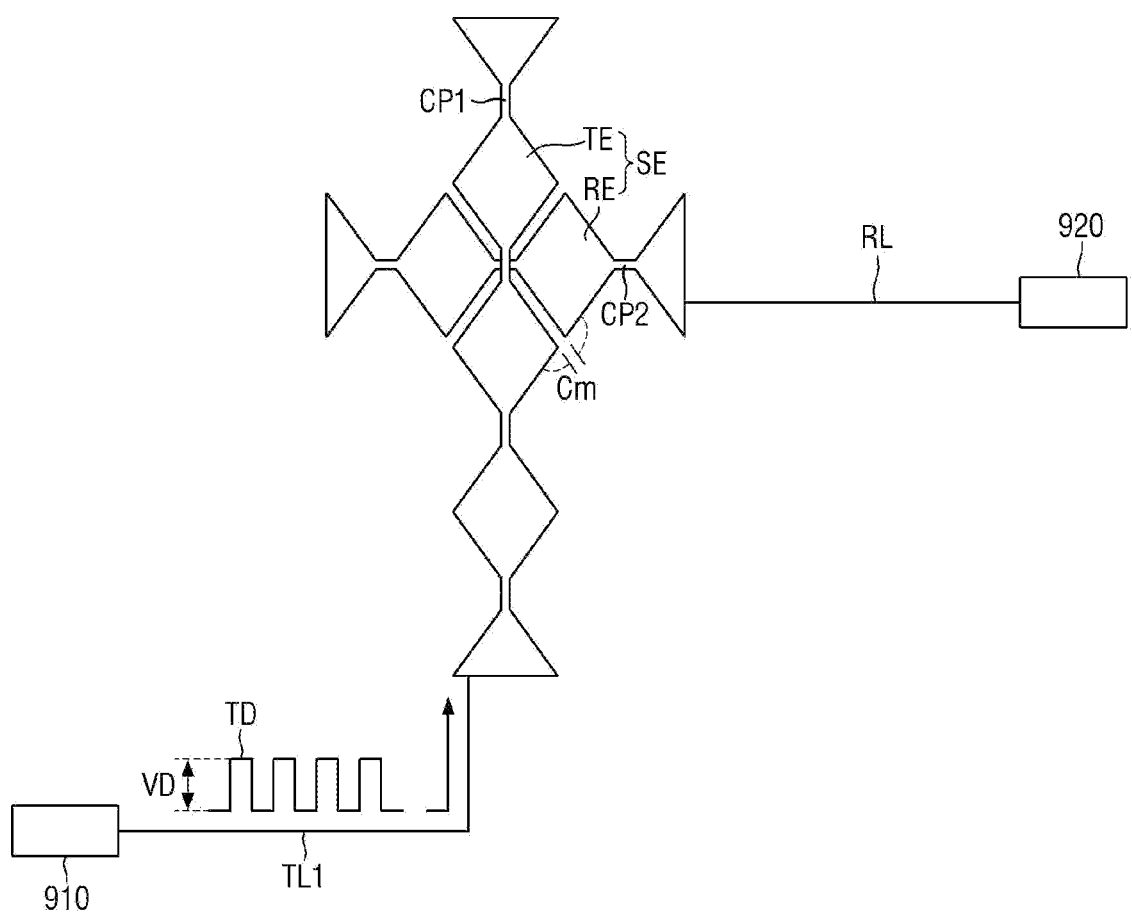
FIG. 11 is a schematic view illustrating a touch driving circuit connected to touch electrodes according to an embodiment of the present disclosure.

FIG. 11 is a schematic view illustrating a touch driving circuit connected to touch electrodes.

For convenience of description, driving electrodes TE disposed on one column and disposed in a first direction DR1 and a first connection portion CP1 for connecting the driving electrodes TE, and sensing electrodes disposed on in one row and disposed in the second direction DR2 and a second connection portion CP2 for connecting the sensing electrodes are only shown in FIG. 11.

Referring to FIG. 11, the touch driving circuit 900 may include a driving signal supply 910 and a sensing signal receiver 920.

The driving signal supply 910 may output a touch driving signal TD to the driving electrodes TE through the first driving line TL1 and output the touch driving signal TD to the driving electrodes TE through the second driving line TL2. The touch driving signal TD may include a plurality of pulses.

The driving signal supply 910 may output the touch driving signal TD to the first and second driving lines TL1 and TL2 in a predetermined order. For example, the driving signal supply 910 may sequentially output the touch driving signal TD from the driving electrodes TE disposed on the left side of the active region AR of FIG. 5 to the driving electrodes TE disposed on the right side of the active region AR.

The sensing signal receiver 920 senses the voltage charged in a mutual capacitance Cm through the sensing line RL electrically connected to the sensing electrodes RE. As shown in FIG. 11, the mutual capacitance Cm may be formed between the driving electrode TE and the sensing electrode RE.

The touch sensor TSU may sense voltages charged in the mutual capacitance Cm to determine whether a touch of the user is input.

Figure 12:
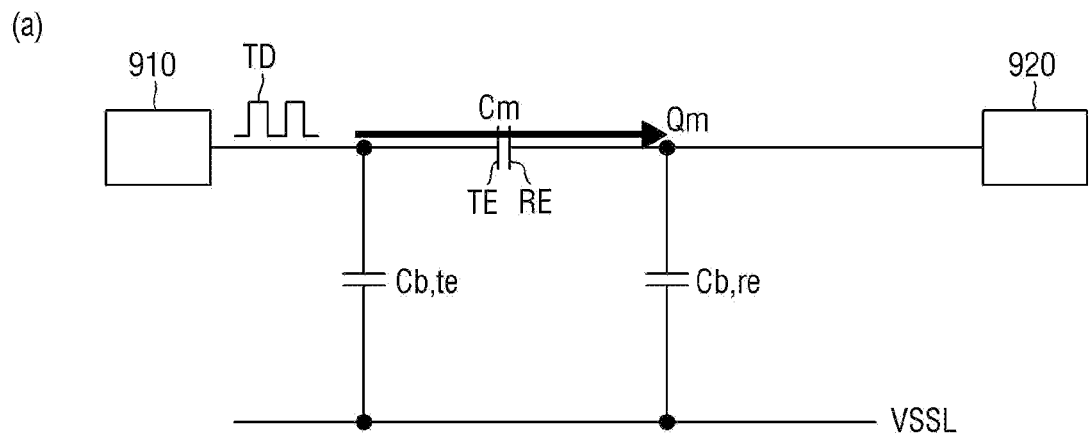
FIG. 12 is a schematic circuit view illustrating a touch sensor recognizing a body touch input according to an embodiment of the present disclosure.
Figure 12:
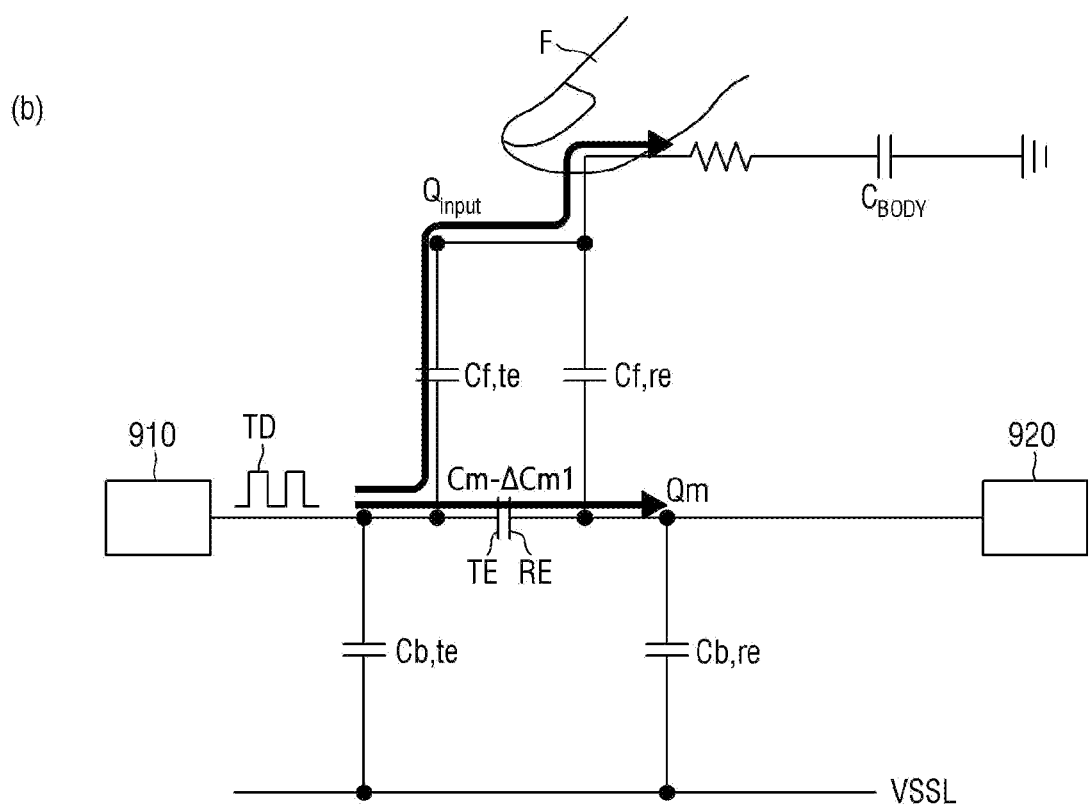

FIG. 12 is a schematic circuit view illustrating the principle that a body touch input is recognized by a touch sensor according to an embodiment. FIG. 12 shows (a) which is a circuit view before a body touch input is performed, and (b) which is a circuit view illustrating the case that a body touch input is performed. FIG. 12 illustrates the example of FIG. 11 in the view of a circuit, and the common electrode 173 supplied with the second power voltage of a low potential through the first thin film transistor TFT1 of the thin film transistor layer TFTL is represented by a power voltage line VSSL. For example, the first parasitic capacitance Cb,te is formed by the power voltage line VSSL and the driving electrode TE, and the second parasitic capacitance Cb,re may be formed by the power voltage line VSSL and the sensing electrode RE.

Referring to (a) in FIG. 12, charges Qm output from the driving signal supply 910 before a touch input of a body F is performed may be charged in the driving electrode TE and the sensing electrode RE to form the mutual capacitance Cm.

Referring to FIG. 12(b), when a touch of the body F is performed, a touch capacitance Cf between the body F and the driving electrode TE and/or the sensing electrode RE may be formed in addition to the mutual capacitance Cm between the driving electrode TE and the sensing electrode RE. Therefore, some charges Qinput exit to the body F without being charged in the driving electrode TE and the sensing electrode RE. The amount of the charges Qinput introduced into the body F is increased or reduced in proportion to the first touch capacitance Cf,te formed between the driving electrode TE and the body F.

In general, the charges charged in the mutual capacitance in the region where the touch is generated by the body F may be "Qm-Qinput". Since the mutual capacitance is proportional to the charged amount of charges, the mutual capacitance may be reduced to "Cm−ΔCm1," when there is a touch of the body F. The sensing electrode RE senses the mutual capacitance that is reduced to "Cm−ΔCm1" and applies the sensed mutual capacitance to the sensing signal receiver 920, thereby recognizing the touch.

Hereinafter, retransmission of the charges and touch sensitivity based on the retransmission will be described with reference to FIGS. 13 to 15, and the principle that the retransmission is avoided in accordance with an embodiment will be described with reference to FIG. 16.

Figure 13:
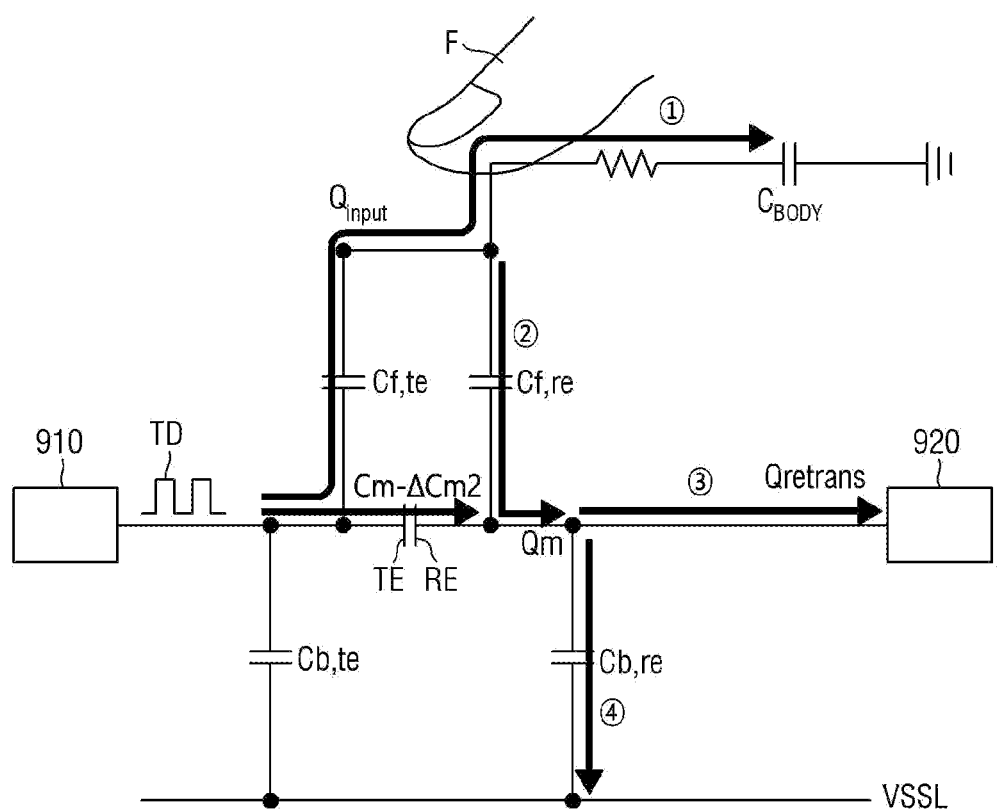
FIG. 13 is a schematic circuit view illustrating a moving path of charges when a body touch input is performed in a grip environment by a touch sensor according to an embodiment of the present disclosure.

FIG. 13 is a schematic circuit view illustrating a moving path of charges when a body touch input is performed in a grip environment by a touch sensor according to an embodiment. FIG. 14 is a schematic circuit view illustrating a moving path of charges when a body touch input is performed in an LGM environment by a touch sensor according to an embodiment. FIG. 15 is a graph illustrating a touch sensitivity change based on a thickness of a passivation layer in the environment of FIGS. 12 to 14. FIG. 16 is a schematic cross-sectional view illustrating a display panel according to an embodiment of the circuit views of FIGS. 13 and 14.

Figure 14:
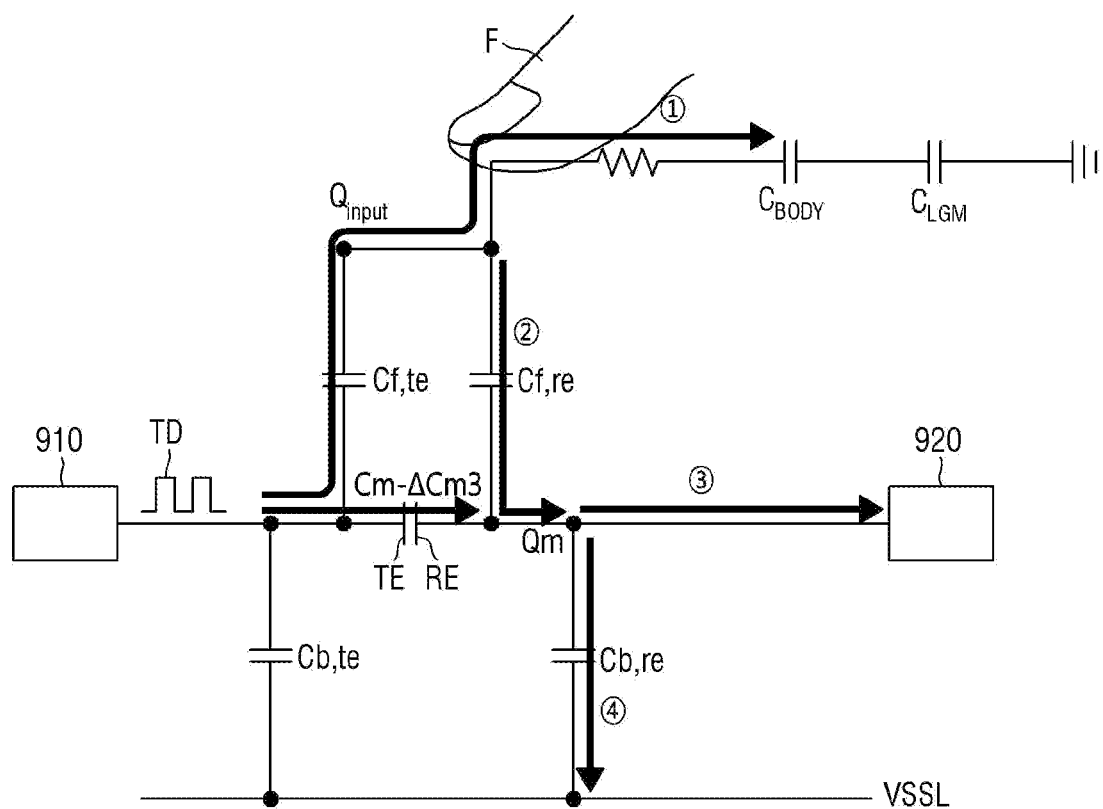
FIG. 14 is a schematic circuit view illustrating a moving path of charges when a body touch input is performed in an LGM environment by a touch sensor according to an embodiment of the present disclosure.
Figure 15:
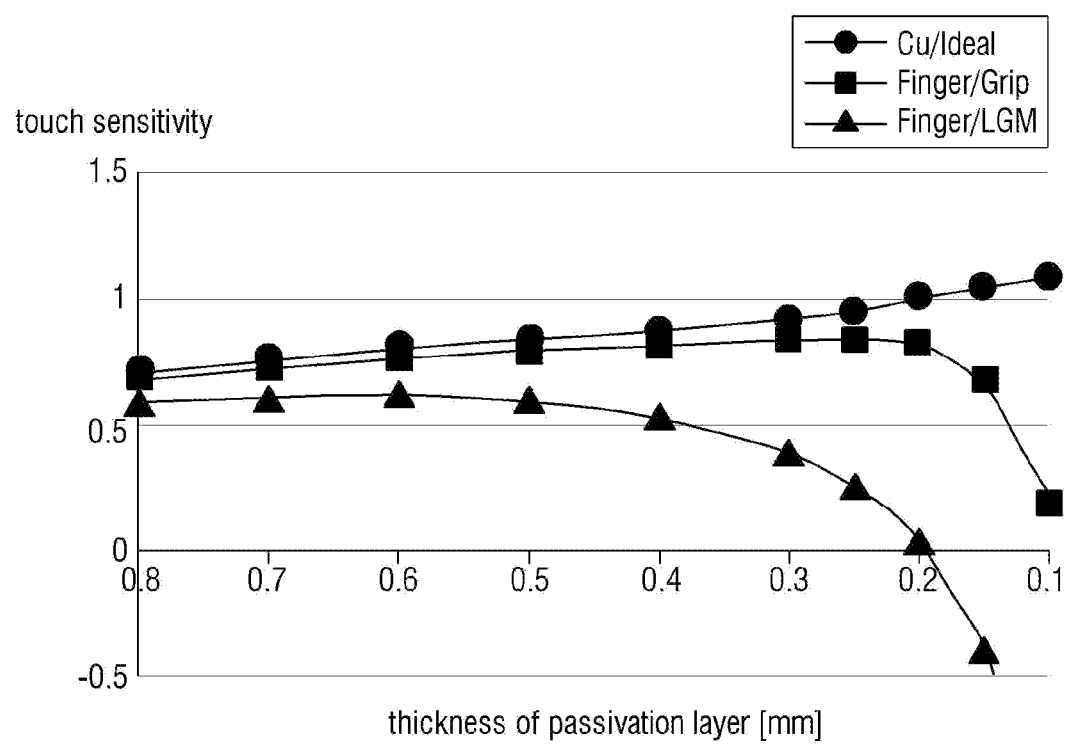
FIG. 15 is a graph illustrating a touch sensitivity change based on a thickness of a passivation layer in the environment of FIGS. 12 to 14 according to an embodiment of the present disclosure.

Referring to FIGS. 13 to 15, when the thicknesses of the second touch insulating layer 230 and the passivation layer WDL of the display device are formed in a ultrathin shape or the passivation layer WDL is omitted, a portion of the charges Qinput that exit through the body F of the user may be retransmitted to the sensing electrode RE.

For example, when a touch of a body F is performed in the display device, a path of the charges Qinput directed to the body F of the user may include a first path ① that allows the charges to exit through the body F of the user and a second path ② that allows the charges to be retransmitted from the body F to the sensing electrode RE. The second path ② for retransmission of the charges from the body F to the sensing electrode RE may be distributed to a third path ③ from the sensing electrode RE to the sensing signal receiver 920 of the touch driving circuit 900 and a fourth path ④ from the sensing electrode RE to the driving voltage line VSSL of the common electrode 173. The amount of charges of the third path ③ may correspond to retransmission charges Qretrans that contribute to a change in the mutual capacitance sensed by the touch sensor TSU. The Equation related to the paths of the charges Qinput is as follows.

$$Q\text{input} = ① + ② = ① + ③ + ④ \quad \text{[Equation 1]}$$

In the Equation 1, Qinput refers to charges directed to the body F of the user, and ①, ②, ③ and ④ denote the first path, the second path, the third path and the fourth path, respectively.

In this embodiment, the amount of change in the mutual capacitance formed between the driving electrode TE and the sensing electrode RE in which the touch is generated has a value (e.g., ΔCm2 or ΔCm3) less than a value of ΔCm1. When the change amount in the mutual capacitance is not sufficiently large enough to recognize the body touch, since the driving electrode TE and the sensing electrode RE are charged with a mutual capacitance (e.g., Cm of FIG. 12) similar to that before the body touch is made, the touch sensor TSU recognizes that a touch is not generated. For example, the charges charged in the mutual capacitance in the region where the touch is generated by the body F may be Qm−Qinput+Qretrans, and the mutual capacitance may be Cm−ΔCm2 or Cm−ΔCm3.

In the LGM environment shown in FIG. 14, the amount of the retransmitted charges Qretrans may be greater than the amount of charges Qretrans (or third path ③ of charges) retransmitted in the grip environment by the body F as shown in FIG. 13. The LGM environment refers to an environment in which a user touches a display device on a bed or touches the display device in a state that the user does not grip the display device. In this embodiment, since each of the user and the display device is spaced apart from the earth ground, the earth ground between the user and the display device becomes unstable. This may be represented by an equivalent circuit of an LGM capacitor $C_{LGM}$ connected in series between the earth ground and a body capacitor $C_{BODY}$ as shown in FIG. 14. In the LGM environment, since the amount of charges that exit to the body capacitor $C_{BODY}$ is more reduced than that of the grip environment, the amount of charges retransmitted to the second path ② may be increased. This results in a decrease in the change amount in the mutual capacitance. For example, since the change amount ΔCm3 in the mutual capacitance of FIG. 14 is less than the change amount ΔCm2 in the mutual capacitance of FIG. 13, the mutual capacitance (e.g., Cm of FIG. 12) similar to that before the body touch is performed is sensed by the touch sensor TSU, whereby sensitivity of the touch sensor TSU may be further reduced.

Referring to the graph of FIG. 15, a touch of a Cu/Ideal state may correspond to FIG. 12, a touch of a Finger/Grip state may correspond to FIG. 13, and a touch of a Finger/LGM state may correspond to FIG. 14. X-axis denotes a thickness of the passivation layer, and Y-axis denotes a relative size of touch sensitivity. In this embodiment, the passivation layer refers to the passivation layer WDL and the second touch insulating layer 230 disposed on the second touch conductive layer 220.

Unlike the touch of the Cu/Ideal state, as the thickness of the passivation layer becomes thinner in the touch of the Finger/Grip state and the touch of the Finger/LGM state, the touch sensitivity may be reduced. When the thickness of the passivation layer is 0.2 mm or less in the touch of the Finger/Grip state, the touch sensitivity of the touch sensor is reduced, and when the thickness of the passivation layer is 0.4 mm or less in the touch of the Finger/LGM state, the touch sensitivity may be reduced.

TABLE 1

|  |  | Cf,re(pF) | Qretrans(xls) |
|---|---|---|---|
| BODY |  | 500 |  |
| Thickness (mm) of | 0.5 | 0.5665 | 0.015 |
| passivation layer | 0.3 | 0.876 | 0.032 |
|  | 0.1 | 1.956 | 0.101 |

Referring to Table 1, as the thickness of the passivation layer becomes thinner, the second touch capacitance Cf,re between the body F and the sensing electrode RE is increased, whereby the amount of charges Qretrans retransmitted from the sensing electrode RE to the touch driving circuit 900 is increased. For example, the touch sensitivity of the touch sensor TSU is reduced.

Figure 16:
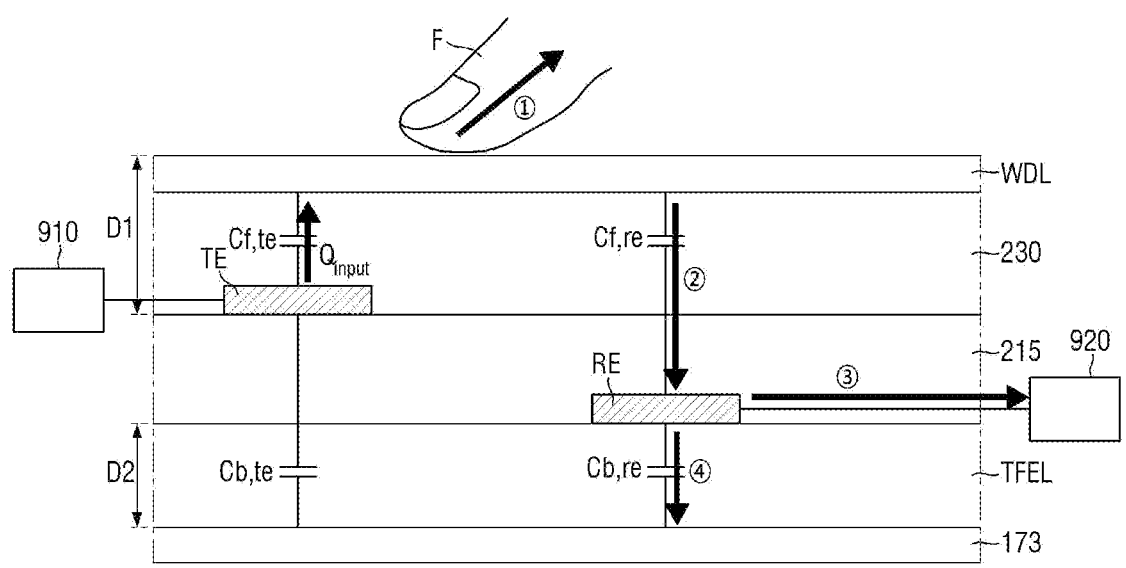
FIG. 16 is a schematic cross-sectional view illustrating a display panel of the circuit views of FIGS. 13 and 14 according to an embodiment of the present disclosure.

Referring to FIG. 16, in the display device 1 according to an embodiment, the sensing electrode RE is disposed below the first touch insulating layer 215 and the driving electrode TE is disposed on the first touch insulating layer 215, whereby the amount of charges Qretrans retransmitted from the sensing electrode RE to the touch driving circuit 900 may be reduced.

For example, since the driving electrode TE is positioned on the first touch insulating layer 215, the distance between the body F and the driving electrode TE may be reduced. According to the Equation 2, the first touch capacitance Cf,te formed by the body F and the driving electrode TE may be increased. Since the first touch capacitance Cf,te is proportional to the amount of charges transmitted to body F as described above, the amount of charges of the first path ①, which are transmitted the body F of the user, may be increased.

$$C \propto \frac{1}{d} \quad \text{[Equation 2]}$$

In the Equation 2, C denotes a capacitance value, and d denotes a distance between the electrodes facing each other.

Similarly, since the sensing electrode RE is positioned below the first touch insulating layer 215, the distance between the body F and the sensing electrode RE may be increased. Therefore, the second touch capacitance Cf,re, which is formed between the body F and the sensing electrode RE, may be reduced. Since the amount of charges of the second path ②, which are retransmitted from the body F to the sensing electrode RE, is proportional to the second touch capacitance Cf,re, the amount of charges of the second path ② retransmitted from the body F to the sensing electrode RE may be reduced.

In addition, since the distance between the sensing electrode RE and the common electrode 173 is reduced, the second parasitic capacitance Cb,re may be increased. Since the amount of charges of the fourth path ④, which are transmitted from the sensing electrode RE to the common electrode 173, is proportional to the second parasitic capacitance Cb,re, the amount of charges of the fourth path ④ may be increased.

Therefore, the amount of retransmission charges Qretrans corresponding to the charges of the third path ③ may be reduced. For example, the retransmission of the charges may be avoided or reduced.

In the display device 1 according to an embodiment, the amount of charges of the first path ①, which exit through the body F of the user, may be increased, the amount of charges of the second path ②, which are retransmitted from the body F to the sensing electrode RE may be reduced, and the amount of charges of the fourth path ④ from the sensing electrode RE to the common electrode 173 may be increased, whereby the amount of charges of the third path ③, which are retransmitted from the sensing electrode RE to the sensing signal receiver 920, may be reduced. Therefore, the touch sensitivity of the touch sensor TSU may be increased.

Figure 17:
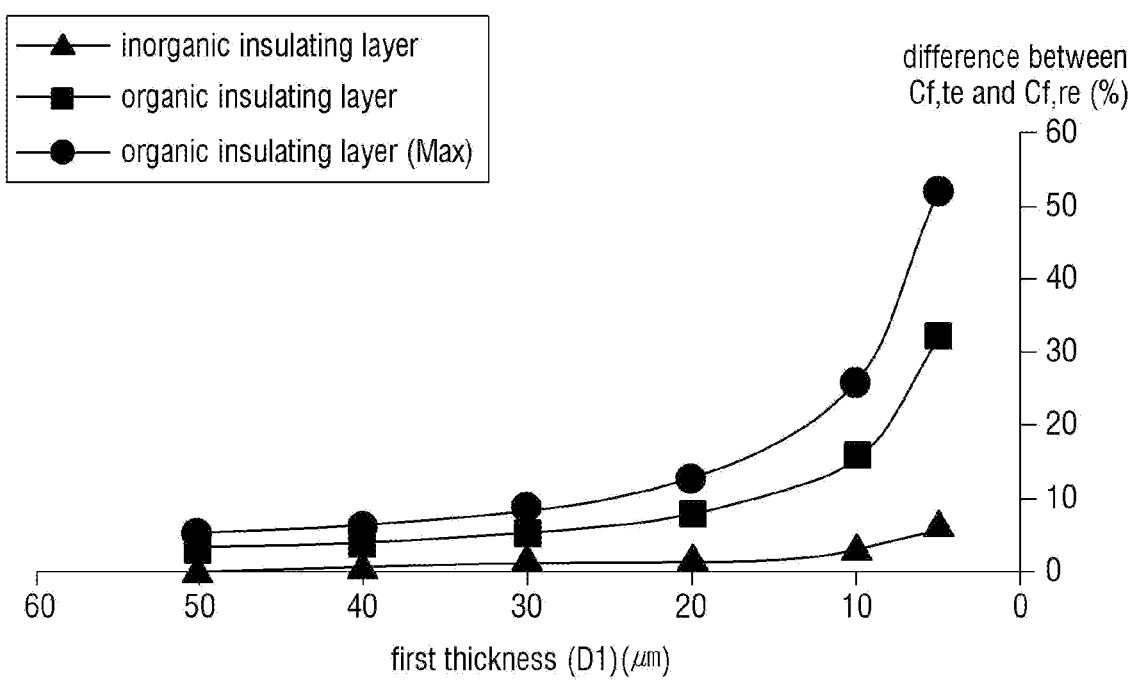
FIG. 17 is a graph illustrating a touch capacitance difference based on a first thickness of FIG. 16 according to an embodiment of the present disclosure.
Figure 18:
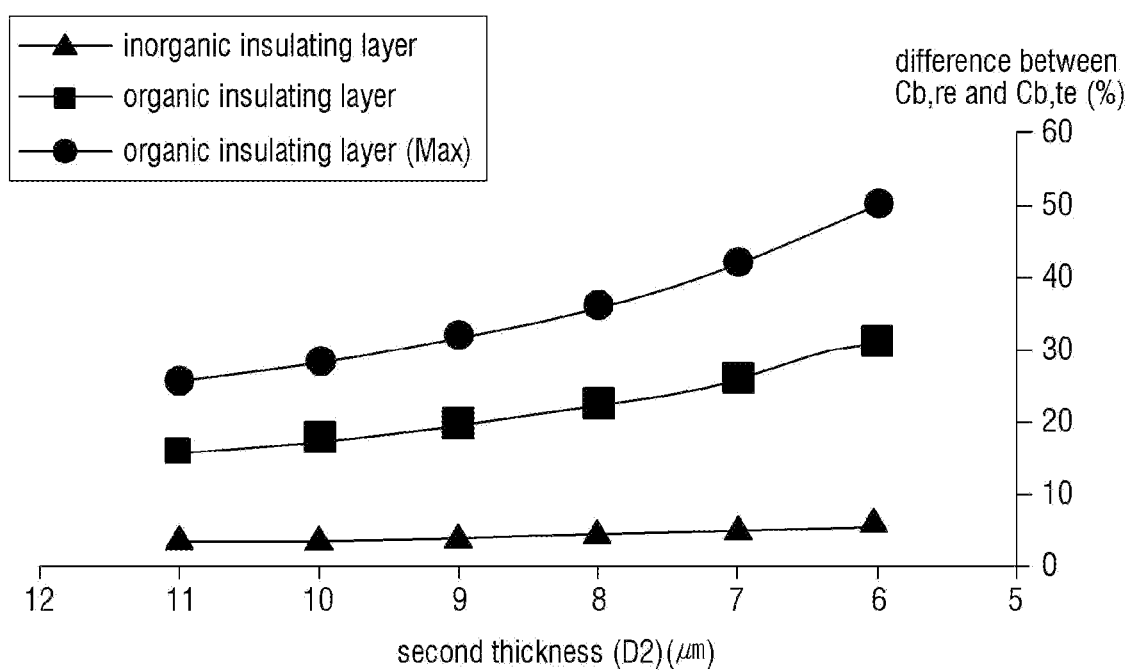
FIG. 18 is a graph illustrating a touch capacitance difference based on a second thickness of FIG. 16 according to an embodiment of the present disclosure.

FIG. 17 is a graph illustrating a touch capacitance difference based on a first thickness of FIG. 16. FIG. 18 is a graph illustrating a touch capacitance difference based on a second thickness of FIG. 16.

Referring to FIGS. 17 and 18, the effect may be maximized as the first thickness D1 of the passivation layer WDL on the first touch insulating layer 215 and the second thickness D2 of the encapsulation layer TFEL below the first touch insulating layer 215 become thinner.

In FIG. 17, the X-axis refers to the first thickness D1 of the passivation layer, and the Y-axis refers to a difference between the first touch capacitance Cf,te and the second touch capacitance Cf,re.

As the first thickness D1 becomes thinner, the distance between the driving electrode TE and the body F and the distance between the sensing electrode RE and the body F are shortened, so that the first touch capacitance Cf,te and the second touch capacitance Cf,re are increased. In this embodiment, since the distance between the driving electrode TE and the body F is shorter, an increasing ratio of the first touch capacitance Cf,te may be greater than that of the second touch capacitance Cf,re. Therefore, as the first thickness D1 becomes thinner, a difference between the first touch capacitance Cf,te and the second touch capacitance Cf,re is increased.

As the first touch capacitance Cf,te is increased, the amount of charges of the first path ① is increased, and the second touch capacitance Cf,re is increased at a relatively low ratio, whereby the charges Qretrans retransmitted to the sensing electrode RE may be reduced.

In FIG. 18, the X-axis refers to the second thickness D2 of the encapsulation layer TFEL, and the Y-axis refers to a difference between the second parasitic capacitance Cb,re and the first parasitic capacitance Cb,te.

Since the distance between the driving electrode TE and the common electrode 173 and the distance between the sensing electrode RE and the common electrode 173 are shortened as the second thickness D2 becomes thinner, the first parasitic capacitance Cb,te and the second parasitic capacitance Cb,re are increased. In this embodiment, since the distance between the sensing electrode RE and the common electrode 173 is less, an increasing ratio of the second parasitic capacitance Cb,re may be greater than that of the first parasitic capacitance Cb,te. Therefore, as the second thickness D2 becomes thinner, the difference between the second parasitic capacitance Cb,re and the first parasitic capacitance Cb,te is increased.

As the second parasitic capacitance Cb,re is increased, the amount of charges of the fourth path ④ is increased, whereby the charges Qretrans retransmitted from the sensing electrode RE to the touch driving circuit 900 may be reduced.

According to an embodiment, bending stress is reduced as the first thickness D1 and the second thickness D2 are thinner, whereby a crack or gap caused by stress may be prevented from occurring in the display panel, and the display device 1 in which touch sensitivity of the touch sensor is increased may be implemented.

Since the thickness of the first touch insulating layer is increased when the first touch insulating layer is made of an organic insulating material rather than an inorganic insulating material, a difference in capacitance may be increased. In addition, when the thickness of the organic insulating material is increased from about 1.5 times to about 9 times, the difference in capacitance may be further increased. Therefore, the touch sensitivity of the touch sensor may be further increased.

Hereinafter, a display device 1 according to embodiment will be described with reference to FIGS. 19 to 22.

Figure 19:
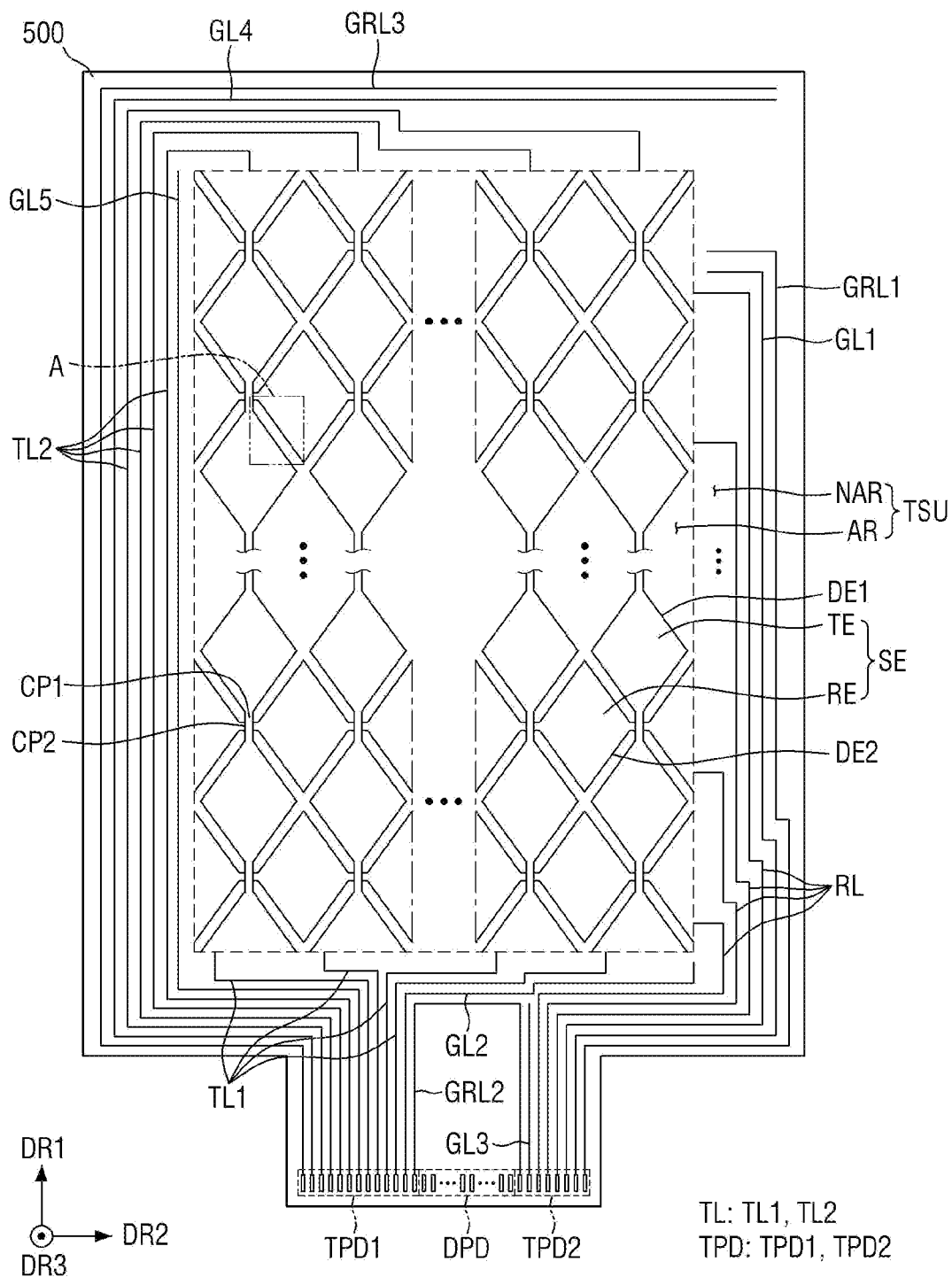
FIG. 19 is a schematic plan layout view illustrating a touch sensor according to an embodiment of the present disclosure.
Figure 20:
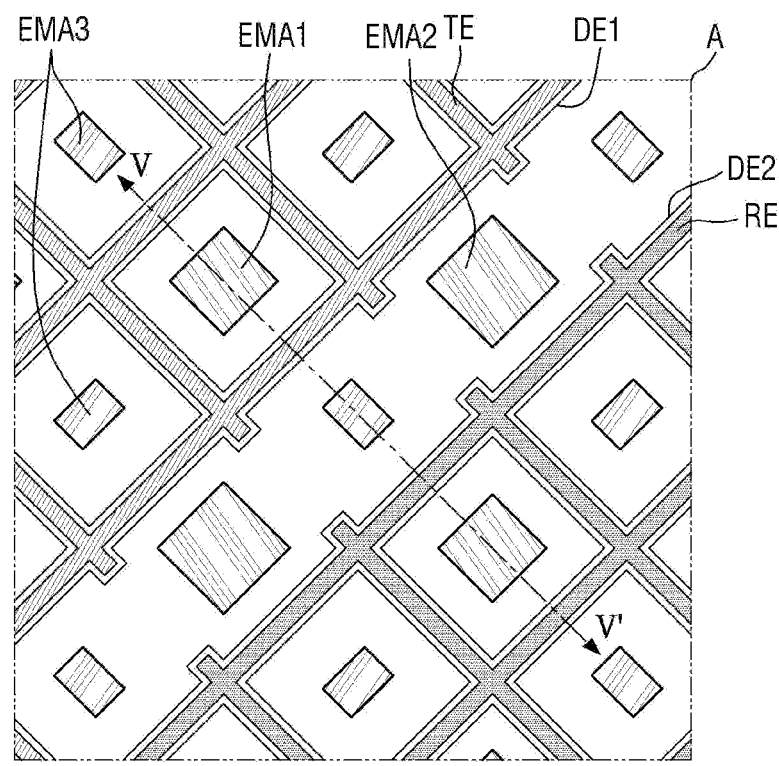
FIG. 20 is an enlarged plan view of a touch sensor of region A of FIG. 19 according to an embodiment of the present disclosure.
Figure 21:
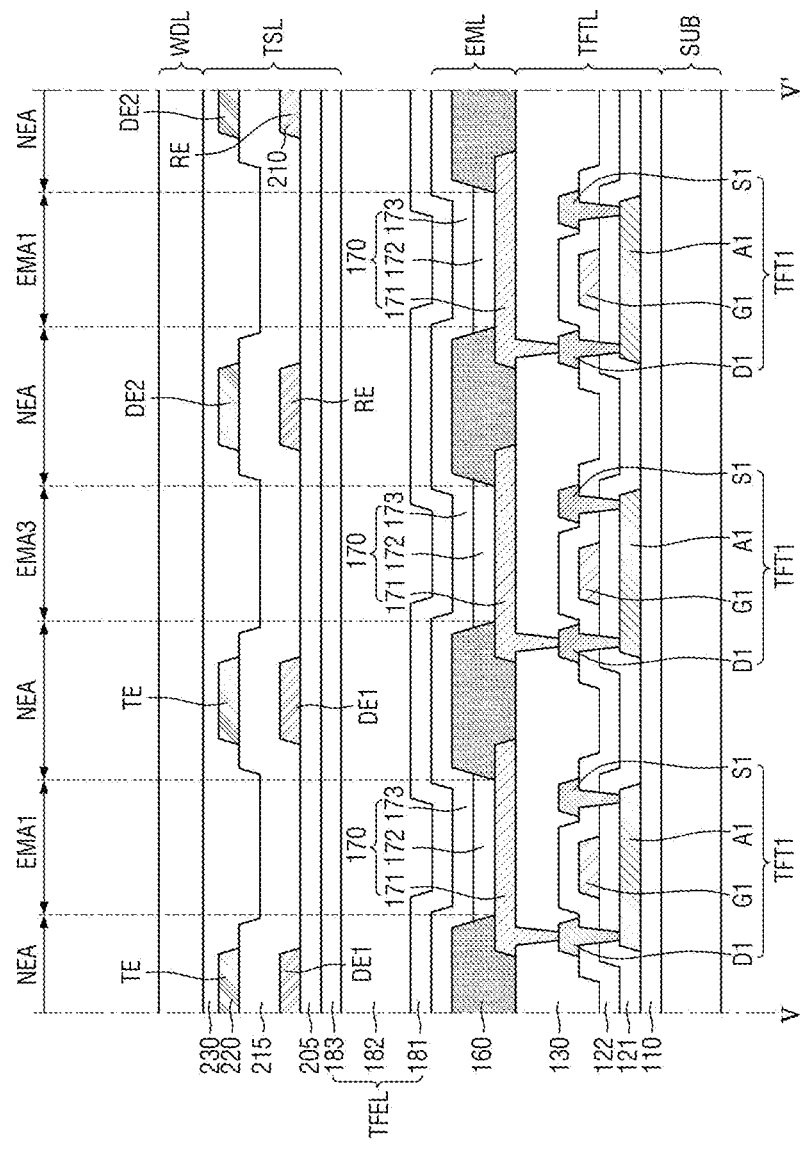
FIG. 21 is a cross-sectional view of a touch sensor taken along line V-V' of FIG. 20 according to an embodiment of the present disclosure.

FIG. 19 is a schematic plan layout view illustrating a touch sensor according to an embodiment. FIG. 20 is an enlarged plan view illustrating A of FIG. 19. FIG. 21 is an example of a cross-sectional view taken along line V-V' of FIG. 20.

The embodiment in FIG. 19 is different from the embodiment shown in FIG. 5 in that the display device 1 according to the embodiment further includes a first dummy electrode DE1 that overlaps the driving electrode TE on a plane and a second dummy electrode DE2 that overlaps the sensing electrode RE on a plane.

Referring to FIGS. 20 and 21, in an embodiment the first dummy electrode DE1 may be included in the first touch conductive layer 210 that is the same layer as the sensing electrode RE, and may include the same material as that of the sensing electrode RE. In addition, the second dummy electrode DE2 may be included in the second touch conductive layer 220 that is the same layer as the driving electrode TE, and may include the same material as that of the driving electrode TE. The first dummy electrode DE1 and the second dummy electrode DE2 may be electrically floated without any voltage applied thereto.

As the first dummy electrode DE1 is disposed to overlap the driving electrode TE and the second dummy electrode DE2 is disposed to overlap the sensing electrode RE, a visibility problem caused by the arrangement of the driving electrode TE and the sensing electrode RE, which are disposed in their respective layers different from each other, may be avoided. For example, when the light emitted from the light emitting element 170 below the driving electrode TE and the sensing electrode RE emits light toward the driving electrode TE and the sensing electrode RE, viewing angles of the light may be different based on the different positions of the driving electrode TE and the sensing electrode RE. In the display device 1 according to an embodiment, the first dummy electrode DE1 and the second dummy electrode DE2 are disposed to overlap the driving electrode TE and the sensing electrode RE, respectively, so that the viewing angles of the light that is emitted may be substantially the same. Therefore, the visibility problem of the display device may be avoided.

Figure 22:
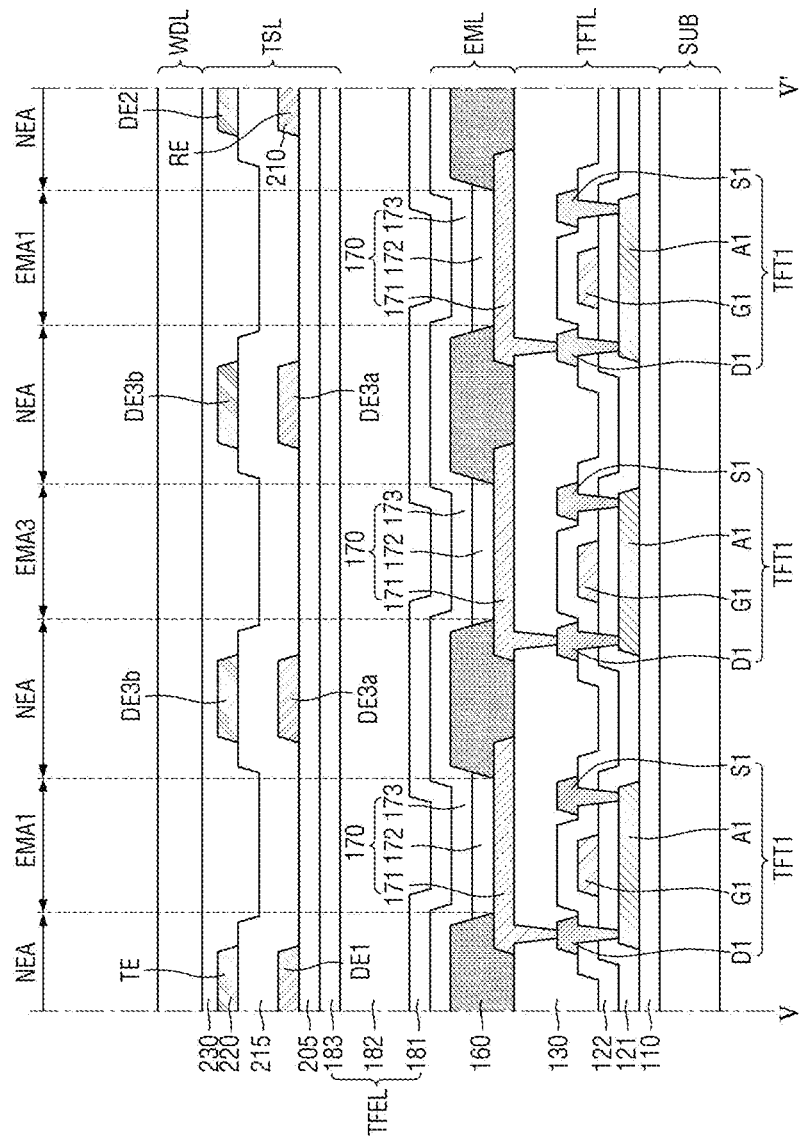
FIG. 22 is a cross-sectional view of a touch sensor taken along line V-V' of FIG. 20 according to an embodiment of the present disclosure.

FIG. 22 is an embodiment of a cross-sectional view taken along line V-V' of FIG. 20.

Referring to FIG. 22, the display device 1 according to an embodiment may further include third dummy electrodes DE3a and DE3b. The third dummy electrodes DE3a and DE3b may be substantially the same as the dummy electrode DE of FIG. 10. The third dummy electrodes DE3a and DE3b may be disposed between the driving electrode TE and the sensing electrode RE, and may be electrically floated. As planar areas of the third dummy electrodes DE3a and DE3b are wider, the parasitic capacitance Cb between the common electrode 173 and the touch electrodes SE may be reduced. Therefore, a charging speed of the mutual capacitance Cm may be increased.

In an embodiment, the third dummy electrodes DE3a and DE3b may include a first sub-dummy electrode DE3a and a second sub-dummy electrode DE3b, which overlap each other in different conductive layers. The first sub-dummy electrode DE3a may be disposed on the same layer as the first touch conductive layer 210, and the second sub-dummy electrode DE3b may be disposed on the same layer as the second touch conductive layer 220.

Hereinafter, the display device 1 according to embodiments of the present disclosure will be described with reference to FIGS. 23 to 26.

Figure 23:
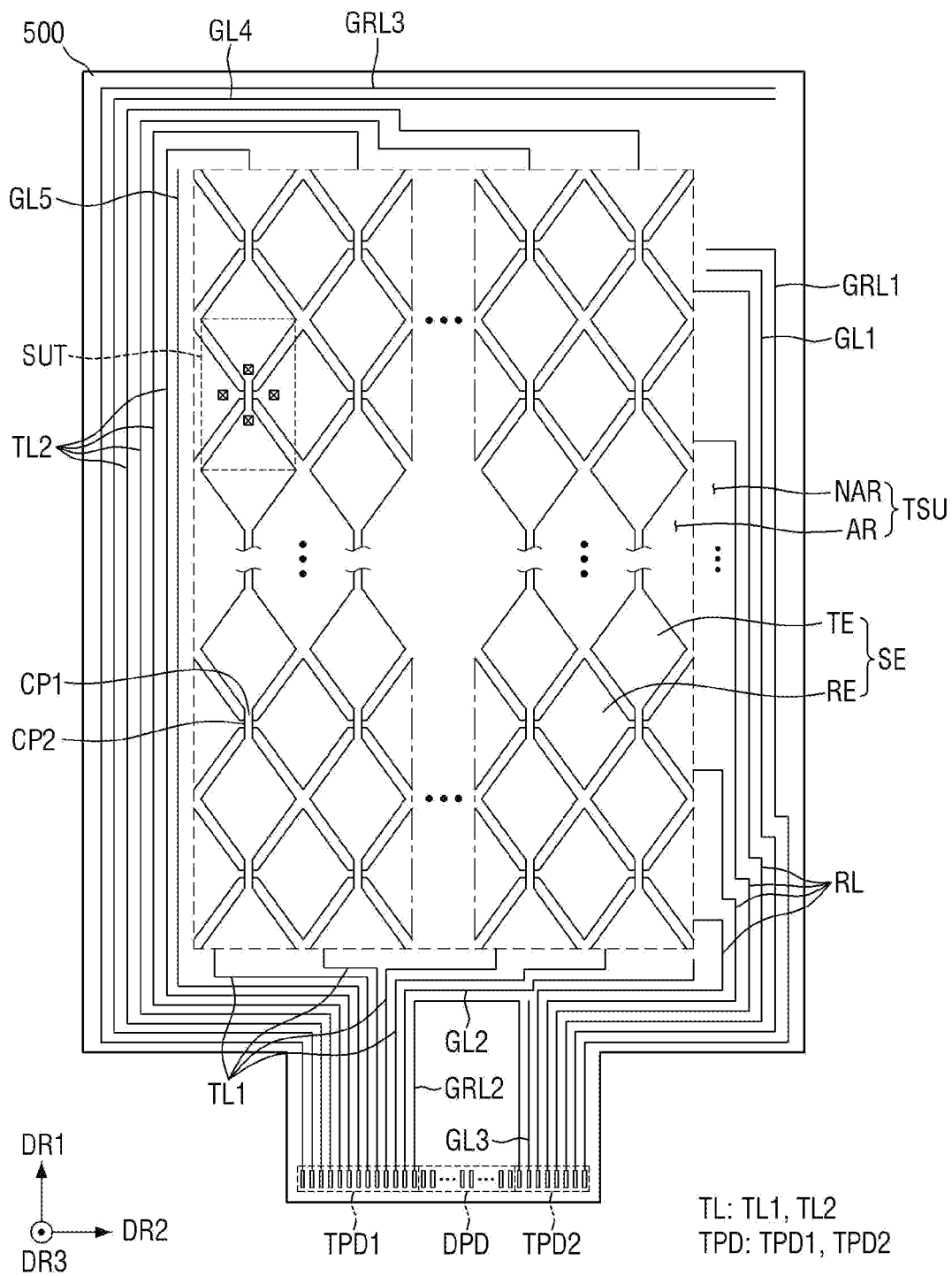
FIG. 23 is a schematic plan layout view illustrating a touch sensor according to an embodiment of the present disclosure.
Figure 24:
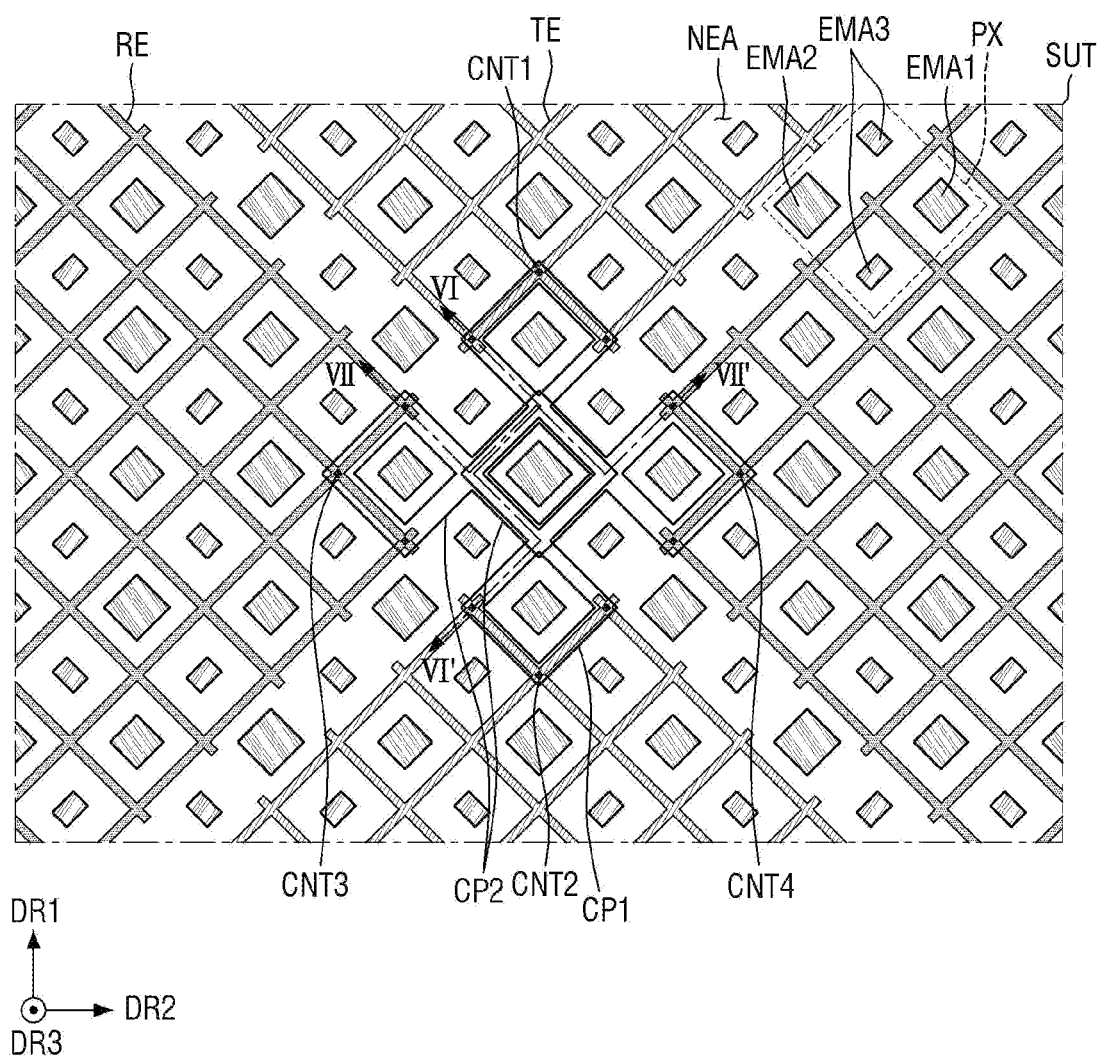
FIG. 24 is a partial enlarged view illustrating a pixel of a display unit and touch electrodes of a touch sensor according to an embodiment of the present disclosure.
Figure 25:
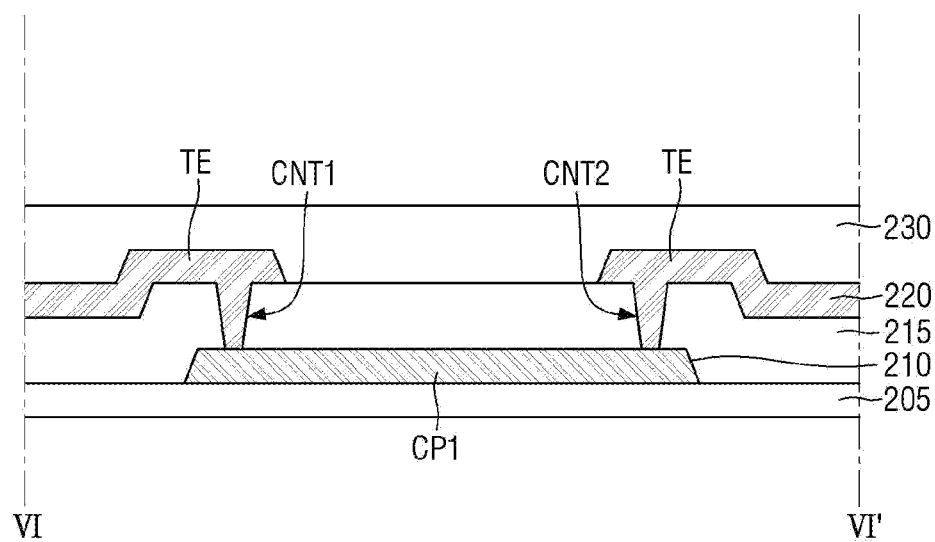
FIG. 25 is a cross-sectional view of a pixel of a display unit and touch electrodes of a touch sensor taken along line VI-VI' of FIG. 24 according to an embodiment of the present disclosure.
Figure 26:
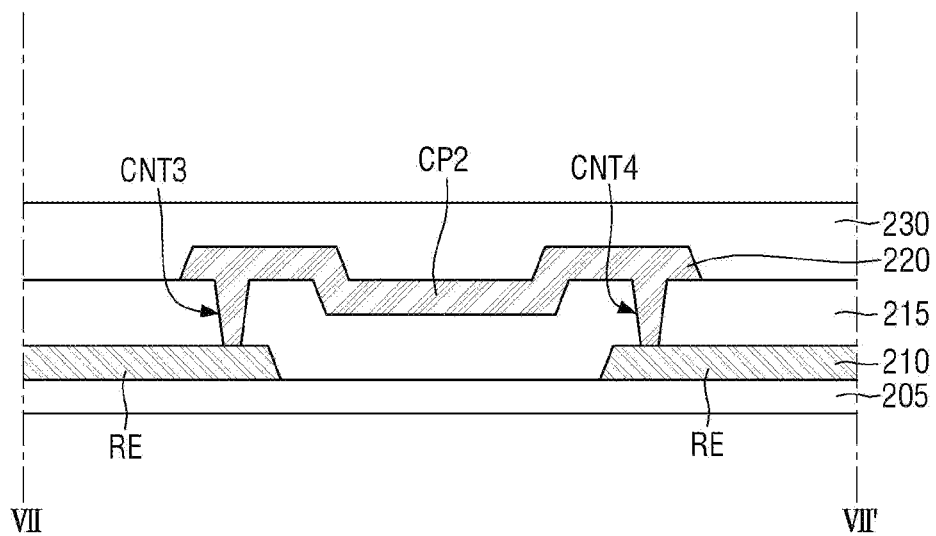
FIG. 26 is a cross-sectional view of a pixel of a display unit and touch electrodes of a touch sensor taken along line VII-VII' of FIG. 24 according to an embodiment of the present disclosure.

FIG. 23 is a schematic plan layout view illustrating a touch sensor according to an embodiment. FIG. 24 is a partial enlarged view illustrating a pixel of a display unit and touch electrodes of a touch sensor according to an embodiment. FIG. 25 is a cross-sectional view taken along line VI-VI' of FIG. 24. FIG. 26 is a cross-sectional view taken along line VII-VII' of FIG. 24.

The display device 1 according to an embodiment is different from that of an embodiment of FIG. 19 in that a first connection portion CP1 for connecting adjacent driving electrodes TE and a second connection portion CP2 for connecting adjacent sensing electrodes RE are connected to each other through a contact hole.

The embodiment is the same as an embodiment of FIG. 19 in that the second touch conductive layer 220 includes the driving electrode TE, the first touch conductive layer 210 includes the sensing electrode RE, and the first connection portion CP1 and the second connection portion CP2 overlap each other on a plane and are insulated from each other in their intersection region.

For example, the first connection portion CP1 is included in the first touch conductive layer 210 that is a conductive layer different from that of the driving electrode TE, and may be connected to the driving electrode TE through a first contact hole CNT1 and a second contact hole CNT2. The second connection portion CP2 is included in the second touch conductive layer 220 that is a conductive layer different from that of the sensing electrode RE, and may be connected to the sensing electrode RE through a third contact hole CNT3 and a fourth contact hole CNT4.

In concluding the detailed description, those skilled in the art will appreciate that many variations and modifications can be made to the described embodiments without substantially departing from the principles of the present disclosure. Therefore, the disclosed embodiments of the present disclosure are used in a generic and descriptive sense only and not for purposes of limitation.

What is claimed is:

1. A display device comprising:
a substrate;
a plurality of sensing electrodes on the substrate;
a first touch insulating layer disposed above the plurality of sensing electrodes;
a plurality of driving electrodes disposed on an upper surface of the first touch insulating layer, the plurality of driving electrodes receiving a touch driving signal; and
a touch driving circuit sensing a change amount of mutual capacitance formed between the plurality of driving electrodes and the plurality of sensing electrodes by the plurality of sensing electrodes,
wherein the first touch insulating layer includes an organic materials,
wherein the touch driving circuit includes:
a driving signal supply applying a touch driving signal to the plurality of driving electrodes;
a sensing signal receiver receiving a sensing signal by the plurality of sensing electrodes;
a driving line connecting the plurality of driving electrodes to the driving signal supply; and
a sensing line connecting the plurality of sensing electrodes to the sensing signal receiver,
wherein:
the driving line includes a first sub-driving line and a second sub-driving line overlapping each other in a thickness direction of the substrate;
the sensing line includes a first sub-sensing line and a second sub-sensing line overlapping each other in the thickness direction of the substrate;
the first sub-driving line and the first sub-sensing line are disposed on a same layer as the plurality of sensing electrodes; and
the second sub-driving line and the second sub-sensing line are disposed on a same layer as the plurality of driving electrodes.

2. The display device of claim 1, further comprising:
a first connection portion connecting adjacent driving electrodes of the plurality of driving electrodes to each other; and
a second connection portion connecting adjacent sensing electrodes of the plurality of sensing electrodes to each other.

3. The display device of claim 2, wherein:
the first connection portion is disposed on a same layer as the plurality of driving electrodes and includes a same material as the plurality of driving electrodes; and
the second connection portion is disposed on a same layer as the plurality of sensing electrodes and includes a same material as the plurality of sensing electrodes.

4. The display device of claim 3, wherein the first connection portion and the second connection portion overlap each other in a thickness direction of the substrate.

5. The display device of claim 1, wherein the plurality of driving electrodes and the plurality of sensing electrodes do not overlap each other in a thickness direction of the substrate.

6. The display device of claim 1, further comprising:
a pixel electrode on the substrate;
a pixel defining layer having an opening that exposes the pixel electrode;
a light emitting layer disposed in the opening of the pixel defining layer on the pixel electrode;
a common electrode on the light emitting layer; and
an encapsulation layer on the common electrode and disposed below the plurality of sensing electrodes.

7. The display device of claim 6, wherein a first capacitance formed by the common electrode and any one of the plurality of driving electrodes is less than a second capacitance formed by the common electrode and any one of the plurality of sensing electrodes.

8. The display device of claim 1, wherein each of the plurality of driving electrodes and the plurality of sensing electrodes has a mesh shape.

9. The display device of claim 1, further comprising:
a first dummy electrode that overlaps the plurality of driving electrodes in a thickness direction of the substrate; and
a second dummy electrode that overlaps the plurality of sensing electrodes in a thickness direction of the substrate.

10. The display device of claim 9, wherein the first dummy electrode is disposed on a same layer as the plurality of sensing electrodes, and the second dummy electrode is disposed on a same layer as the plurality of driving electrodes.

11. The display device of claim 9, wherein the first dummy electrode includes a same material as that of the plurality of sensing electrodes, and the second dummy electrode includes a same material as that of the plurality of driving electrodes.

12. The display device of claim 10, wherein the first dummy electrode and the second dummy electrode are electrically floated.

13. The display device of claim 1, further comprising a first sub-dummy electrode and a second sub-dummy electrode that are disposed between the plurality of driving electrodes and the plurality of sensing electrodes on a plane, the first sub-dummy electrode and the second sub-dummy electrode overlapping each other in a thickness direction of the substrate.

14. The display device of claim 13, wherein:
the first sub-dummy electrode is disposed on a same layer as the plurality of sensing electrodes and includes a same material as that of the plurality of sensing electrodes; and
the second sub-dummy electrode is disposed on a same layer as the plurality of driving electrodes and includes a same material as that of the plurality of driving electrodes.

15. The display device of claim 2, wherein:
the first connection portion is disposed on a same layer as the plurality of sensing electrodes and includes a same material as that of the plurality of sensing electrodes; and the second connection portion is disposed on a same layer as the plurality of driving electrodes and includes a same material as that of the plurality of driving electrodes.

16. The display device of claim 15, wherein:
the first connection portion is connected to any one of the plurality of driving electrodes through a first contact hole that passes through the first touch insulating layer; and
the second connection portion is connected to any one of the plurality of sensing electrodes through a second contact hole that passes through the first touch insulating layer.

17. A display device comprising:
a substrate;
a pixel electrode on the substrate;
a pixel defining layer including an opening that exposes the pixel electrode;
a light emitting layer disposed in the opening of the pixel defining layer on the pixel electrode;
a common electrode on the light emitting layer;
an encapsulation layer on the common electrode;
a plurality of sensing electrodes on the encapsulation layer;
a first touch insulating layer disposed above the plurality of sensing electrodes;
a plurality of driving electrodes on an upper surface of the first touch insulating layer, the plurality of driving electrodes receiving a touch driving signal; and
a touch driving circuit sensing a change amount of mutual capacitance formed between the plurality of driving electrodes and the plurality of sensing electrodes by the plurality of sensing electrodes,
wherein a first capacitance formed by the common electrode and any one of the plurality of driving electrodes is less than a second capacitance formed by the common electrode and any one of the plurality of sensing electrodes,
wherein the touch driving circuit includes:
a driving signal supply applying the touch driving signal to the plurality of driving electrodes;
a sensing signal receiver receiving a sensing signal by the plurality of sensing electrodes;
a driving line connecting the plurality of driving electrodes to the driving signal supply; and
a sensing line connecting the plurality of sensing electrodes to the sensing signal receiver,
wherein:
the driving line includes a first sub-driving line and a second sub-driving line overlapping each other in a thickness direction of the substrate;
the sensing line includes a first sub-sensing line and a second sub-sensing line overlapping each other in the thickness direction of the substrate;
the first sub-driving line and the first sub-sensing line are disposed on a same layer as the plurality of sensing electrodes; and
the second sub-driving line and the second sub-sensing line are disposed on a same layer as the plurality of driving electrodes.

* * * * *